(12) United States Patent
McCraven

(10) Patent No.: US 10,871,240 B2
(45) Date of Patent: *Dec. 22, 2020

(54) MECHANICAL STOP FOR ACTUATOR AND ORIFICE

(71) Applicant: Mueller International, LLC, Atlanta, GA (US)

(72) Inventor: Jeremy McCraven, Salisbury, NC (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,812

(22) Filed: Jan. 23, 2018

(65) Prior Publication Data

US 2018/0149283 A1    May 31, 2018

Related U.S. Application Data

(63) Continuation of application No. 15/288,156, filed on Oct. 7, 2016, now Pat. No. 9,909,680, which is a (Continued)

(51) Int. Cl.
*F16K 31/06* (2006.01)
*F16K 27/02* (2006.01)
(Continued)

(52) U.S. Cl.
CPC ............ *F16K 31/06* (2013.01); *F16K 27/029* (2013.01); *F16K 31/0675* (2013.01);
(Continued)

(58) Field of Classification Search
CPC ........ F16K 31/06; F16K 51/00; F16K 27/029; G05D 7/0688
See application file for complete search history.

(56) References Cited

U.S. PATENT DOCUMENTS

| 691,904 A | 1/1902 | Hallbergh |
| 1,165,429 A | 12/1915 | Mass |

(Continued)

FOREIGN PATENT DOCUMENTS

| CA | 2476119 | 2/2005 |
| WO | 9934140 | 7/1999 |

OTHER PUBLICATIONS

Linkel, Scott; Office Action for Canadian application No. 2,777,973, filed May 23, 2012, dated Apr. 4, 2018, 4 pgs.

(Continued)

*Primary Examiner* — Kevin R Barss
(74) *Attorney, Agent, or Firm* — Taylor English Duma LLP

(57) ABSTRACT

A valve includes a valve cover, the valve cover including a solenoid attachment portion defining a threaded solenoid attachment sink and a valve cover mechanical stop; and a solenoid, the solenoid including a solenoid body, a valve cover attachment portion defining a threaded attachment portion engageable with the threaded solenoid attachment sink, the solenoid body including a solenoid mechanical stop, the solenoid mechanical stop engageable with the valve cover mechanical stop; wherein the valve cover mechanical stop and the solenoid mechanical stop are configured to create a sound upon engagement with each other.

22 Claims, 12 Drawing Sheets

Related U.S. Application Data continuation of application No. 14/273,823, filed on May 9, 2014, now Pat. No. 9,494,249.

(51) Int. Cl.
*F16K 51/00* (2006.01)
*G05D 7/06* (2006.01)

(52) U.S. Cl.
CPC .......... *F16K 51/00* (2013.01); *G05D 7/0688* (2013.01); *Y10T 137/0491* (2015.04)

(56) References Cited

U.S. PATENT DOCUMENTS

| | | |
|---|---|---|
| 1,808,209 A | 6/1931 | Earl |
| 1,808,212 A | 6/1931 | Earl |
| 2,302,529 A | 11/1942 | Cornell et al. |
| 2,572,175 A | 10/1951 | McPherson |
| 3,245,651 A | 4/1966 | Erickson |
| 3,254,660 A | 6/1966 | Ray |
| 3,430,657 A | 3/1969 | Junck et al. |
| 3,593,957 A | 7/1971 | Dolter et al. |
| 3,653,261 A | 4/1972 | Feldman |
| 3,672,233 A | 6/1972 | Hjermstad |
| 3,729,026 A | 4/1973 | Wilke |
| 3,731,534 A | 5/1973 | Painley et al. |
| 3,795,144 A | 3/1974 | Marchesi |
| 3,894,432 A | 7/1975 | Coughlin |
| 4,508,136 A | 4/1985 | Kah, Jr. |
| 4,901,751 A | 2/1990 | Story |
| 4,953,403 A | 9/1990 | Springer |
| 4,967,996 A | 11/1990 | Sonoda et al. |
| 5,251,480 A | 10/1993 | Brunson, IV et al. |
| 5,267,587 A | 12/1993 | Brown |
| 5,519,387 A | 5/1996 | Besier et al. |
| 5,540,347 A * | 7/1996 | Griffin ............... B60K 15/0406 137/493.1 |
| 5,546,801 A | 8/1996 | Swinson et al. |
| 5,767,790 A | 6/1998 | Jovellana |
| 5,979,863 A | 11/1999 | Lousberg |
| 5,986,573 A | 11/1999 | Franklin et al. |
| 5,996,608 A | 12/1999 | Hunter et al. |
| 6,069,571 A | 5/2000 | Tell |
| 6,115,677 A | 9/2000 | Perthold et al. |
| 6,150,955 A | 11/2000 | Tracy et al. |
| 6,152,173 A | 11/2000 | Makowan |
| 6,208,266 B1 | 3/2001 | Lyons et al. |
| 6,237,618 B1 | 5/2001 | Kushner |
| 6,325,099 B1 * | 12/2001 | Bunschoten ......... B67D 1/0832 137/614.04 |
| 6,426,027 B1 | 7/2002 | Scarborough et al. |
| 6,491,062 B1 | 12/2002 | Croft |
| 6,536,469 B2 | 3/2003 | Dilger et al. |
| 6,556,142 B2 | 4/2003 | Dunstan |
| 6,568,416 B2 | 5/2003 | Tucker |
| 6,618,709 B1 | 9/2003 | Sneeringer |
| 6,657,552 B2 | 12/2003 | Belski et al. |
| 6,701,956 B1 | 3/2004 | Berger |
| 6,880,567 B2 | 4/2005 | Klaver |
| 6,982,651 B2 | 1/2006 | Fischer |
| 7,099,781 B1 | 8/2006 | Heidl et al. |
| 7,111,817 B2 | 9/2006 | Teti et al. |
| 7,143,645 B2 | 12/2006 | Benson et al. |
| 7,228,726 B2 | 6/2007 | Kates |
| 7,248,179 B2 | 7/2007 | Smit |
| 7,250,874 B2 | 7/2007 | Mueller et al. |
| 7,267,014 B2 | 9/2007 | Winter |
| 7,304,587 B2 | 12/2007 | Boaz |
| 7,349,766 B2 | 3/2008 | Rodgers |
| 7,385,524 B1 | 6/2008 | Orlosky |
| D583,692 S | 12/2008 | Ball et al. |
| 7,533,693 B2 | 5/2009 | Colton et al. |
| 7,549,439 B2 | 6/2009 | Kimura et al. |
| 7,559,529 B2 | 7/2009 | Affaticati et al. |
| 7,604,216 B2 | 10/2009 | Gebler |
| 7,671,480 B2 | 3/2010 | Pitchford et al. |
| 7,690,393 B2 | 4/2010 | Nagle et al. |
| 7,694,934 B2 | 4/2010 | Irwin |
| 7,740,024 B2 | 6/2010 | Brodeur |
| 7,746,246 B2 | 6/2010 | Salser |
| 7,775,422 B2 | 8/2010 | Winter et al. |
| 7,806,382 B1 | 10/2010 | Palumbo et al. |
| 7,817,063 B2 | 10/2010 | Hawkins et al. |
| 7,825,793 B1 | 11/2010 | Spillman et al. |
| 7,880,641 B2 | 2/2011 | Parris et al. |
| 8,013,732 B2 | 9/2011 | Petite et al. |
| 8,347,427 B2 | 1/2013 | Klicpera |
| 8,516,925 B2 * | 8/2013 | Johnson .................. A47L 13/38 81/53.12 |
| 8,539,827 B2 | 9/2013 | Benson et al. |
| 8,719,187 B2 | 5/2014 | Milanes Garcia-Moreno |
| 8,776,593 B2 | 7/2014 | Margalit et al. |
| 8,833,390 B2 | 9/2014 | Ball et al. |
| 8,866,634 B2 | 10/2014 | Williamson et al. |
| 8,911,191 B2 * | 12/2014 | James ..................... F16L 3/123 248/220.41 |
| 8,931,337 B2 | 1/2015 | Renoud |
| 9,019,120 B2 | 4/2015 | Broniak et al. |
| 9,061,307 B2 | 6/2015 | Klicpera et al. |
| 9,254,499 B2 | 2/2016 | Klicpera |
| 9,266,136 B2 | 2/2016 | Klicpera |
| 9,297,150 B2 | 3/2016 | Klicpera |
| 9,494,249 B2 | 11/2016 | McCraven |
| 9,494,480 B2 | 11/2016 | Klicpera |
| 9,749,792 B2 | 8/2017 | Klicpera |
| 9,909,680 B2 | 3/2018 | Mccraven |
| 10,655,999 B2 | 5/2020 | Ball et al. |
| 2003/0034900 A1 | 2/2003 | Han |
| 2003/0076241 A1 | 4/2003 | Middleton |
| 2004/0193329 A1 | 9/2004 | Ransom et al. |
| 2005/0236594 A1 | 10/2005 | Lilly et al. |
| 2005/0246295 A1 | 11/2005 | Cameron |
| 2006/0012491 A1 | 1/2006 | Mahowald |
| 2006/0059977 A1 | 3/2006 | Kates |
| 2006/0137090 A1 | 6/2006 | Jeffries et al. |
| 2006/0284784 A1 | 12/2006 | Smith |
| 2007/0284293 A1 | 12/2007 | Pitchford et al. |
| 2008/0061769 A1 | 3/2008 | Junk et al. |
| 2008/0084260 A1 | 4/2008 | Swartzentruber |
| 2008/0149180 A1 | 6/2008 | Parris |
| 2008/0150750 A1 | 6/2008 | Parris |
| 2008/0169910 A1 | 7/2008 | Greene et al. |
| 2009/0058676 A1 | 3/2009 | Orlosky |
| 2009/0070682 A1 | 3/2009 | Dawes et al. |
| 2009/0153357 A1 | 6/2009 | Bushman et al. |
| 2009/0164050 A1 | 6/2009 | Ahmad |
| 2009/0188313 A1 | 7/2009 | Ball |
| 2009/0255346 A1 | 10/2009 | Hendey et al. |
| 2009/0271045 A1 | 10/2009 | Savelle |
| 2009/0322453 A1 | 12/2009 | Kawaguchi |
| 2010/0060479 A1 | 3/2010 | Salter |
| 2011/0035063 A1 | 2/2011 | Palayur |
| 2011/0108136 A1 | 5/2011 | Margalit et al. |
| 2011/0114202 A1 | 5/2011 | Goseco |
| 2012/0068476 A1 | 3/2012 | Bradfield |
| 2012/0068477 A1 | 3/2012 | Bradfield |
| 2012/0193559 A1 | 8/2012 | Benson et al. |
| 2012/0305084 A1 | 12/2012 | Ball |
| 2013/0214883 A1 | 8/2013 | Yano |
| 2014/0338464 A1 | 11/2014 | Ball |
| 2015/0323091 A1 | 11/2015 | McCraven |
| 2017/0023146 A1 | 1/2017 | McCraven |
| 2017/0234712 A1 | 8/2017 | Ball |
| 2020/0141782 A1 | 5/2020 | Ball et al. |

OTHER PUBLICATIONS

Ball, Marty Scott; Applicant-Initiated Interview Summary for U.S. Appl. No. 14/451,896, filed Aug. 5, 2014, dated Mar. 17, 2018, 4 pgs.

Ball, Marty Scott; Final Office Action for U.S. Appl. No. 15/584,169, filed May 2, 2017, dated Feb. 13, 2019, 16 pgs.

(56) References Cited

OTHER PUBLICATIONS

Linkel, Scott; Office Action for Canadian application No. 2,777,973, filed May 23, 2012, dated Feb. 18, 2019, 5 pgs.
Ball, Marty Scott; Issue Notification for U.S. Appl. No. 13/149,720, filed May 31, 2011, dated Aug. 27, 2014, 1 pg.
Ball, Marty Scott; Non-Final Office Action for U.S. Appl. No. 13/149,720, filed May 31, 2011, dated Mar. 11, 2014, 75 pgs.
Ball, Marty Scott; Notice of Allowance for U.S. Appl. No. 13/149,720, filed May 31, 2011, dated Jun. 24, 2014, 29 pgs.
Ball, Marty Scott; Supplemental Notice of Allowability for U.S. Appl. No. 13/149,720, filed May 31, 2011, dated Aug. 12, 2014, 4 pgs.
Ball, Marty Scott; Final Office Action for U.S. Appl. No. 14/451,896, filed Aug. 5, 2014, dated Oct. 14, 2016; 17 pgs.
Ball, Marty Scott; Final Office Action for U.S. Appl. No. 14/451,896, filed Aug. 5, 2014, dated Sep. 7, 2017, 11 pgs.
Ball, Marty Scott; Non-Final Office Action for U.S. Appl. No. 14/451,896, filed Aug. 5, 2014; dated Jan. 16, 2018; 18 pgs.
Ball, Marty Scott; Non-Final Office Action for U.S. Appl. No. 14/451,896, filed Aug. 5, 2014, dated Mar. 18, 2016, 98 pgs.
Ball, Marty Scott; Non-Final Office Action for U.S. Appl. No. 14/451,896, filed Aug. 5, 2014, dated May 12, 2016; 17 pages.
Ball, Marty Scott; Non-Final Office Action for U.S. Appl. No. 14/451,896, filed Aug. 5, 2014, dated Feb. 27, 2017, 16 pgs.
Ball, Marty Scott; Final Office Action for U.S. Appl. No. 15/584,169, filed May 2, 2017, dated Feb. 22, 2018, 19 pgs.
Ball, Marty Scott; Non-Final Office Action for U.S. Appl. No. 15/584,169, filed May 2, 2017, dated Sep. 27, 2017, 26 pgs.
Ball, Marty Scott; Mexico Office Action for serial No. MX/a/2012/006097, filed May 25, 2012, dated Mar. 19, 2015, 3 pgs.
Ball, Marty Scott; Mexico Office Action for serial No. MX/a/2012/006097, filed May 25, 2012, dated May 26, 2015, 5 pgs.
McCraven, Jeremy; Applicant Interview Summary for U.S. Appl. No. 14/273,823, filed May 9, 2014, dated Jan. 12, 2016, 3 pgs.
McCraven, Jeremy; Issue Notification for U.S. Appl. No. 14/273,823, filed May 9, 2014, dated Oct. 26, 2016; 1 pg.
McCraven, Jeremy; Non-Final Office Action for U.S. Appl. No. 14/273,823, filed May 9, 2014, dated Dec. 8, 2015, 18 pgs.
McCraven, Jeremy; Non-Final Office Action for U.S. Appl. No. 14/273,823, filed May 9, 2014, dated Apr. 12, 2016, 86 pgs.
McCraven, Jeremy; Notice of Allowance for U.S. Appl. No. 14/273,823, filed May 9, 2014, dated Jul. 7, 2016, 10 pgs.
McCraven, Jeremy; Supplemental Notice of Allowability for U.S. Appl. No. 14/273,823, filed May 9, 2014, dated Aug. 9, 2016, 6 pgs.
McCraven, Jeremy; Supplemental Notice of Allowance for U.S. Appl. No. 14/273,823, filed May 9, 2014, dated Oct. 14, 2016; 4 pgs.
McCraven, Jeremy; Corrected Notice of Allowance for U.S. Appl. No. 15/288,156, filed Oct. 7, 2016, dated Nov. 6, 2017, 5 pgs.
McCraven, Jeremy; Issue Notification for U.S. Appl. No. 15/288,156, filed Oct. 7, 2016, dated Feb. 14, 2018, 1 pg.
McCraven, Jeremy; Non-Final Office Action for U.S. Appl. No. 15/288,156, filed Oct. 7, 2016, dated Jul. 24, 2017, 25 pgs.
McCraven, Jeremy; Notice of Allowance for U.S. Appl. No. 15/288,156, filed Oct. 7, 2016, dated Oct. 27, 2017, 7 pgs.
McCraven, Jeremy; Response to Amendment under Rule 312 for U.S. Appl. No. 15/288,156, filed Oct. 7, 2016, dated Nov. 21, 2017, 2 pgs.
McCraven, Jeremy; Supplemental Notice of Allowance for U.S. Appl. No. 15/288,156, filed Oct. 7, 2016, dated Nov. 16, 2017, 4 pgs.
McCraven, Jeremy; Supplemental Notice of Allowance for U.S. Appl. No. 15/288,156, filed Oct. 7, 2016, dated Feb. 6, 2018, 4 pgs.
Ball, Marty Scott; Final Office Action for U.S. Appl. No. 14/451,896, filed Aug. 5, 2014, dated Aug. 10, 2018, 23 pgs.
Ball, Marty Scott; Non-Final Office Action for U.S. Appl. No. 15/584,169, filed May 2, 2017, dated Aug. 13, 2018, 18 pgs.
Ball, Marty Scott; Non-Final Office Action for U.S. Appl. No. 15/584,169, filed May 2, 2017, dated Mar. 27, 2019, 10 pgs.
Ball, Marty Scott; Notice of Allowance for U.S. Appl. No. 15/584,169, filed May 2, 2017, dated Oct. 2, 2019, 11 pgs.
Ball, Marty Scott; Office Action for Mexico patent application No. MX/a/2015/013381, filed May 25, 2012, dated Oct. 9, 2019, 7 pgs.
Article entitled: "Thermocouple Wire Report", located at <http://www.lieda.co.za/Wordpress/wp-content/uploads/reports/ThermocoupleWireReport.pdf>, webpage last updated on Apr. 8, 2004, 18 pgs.
Ball, Marty Scott; Corrected Notice of Allowance for U.S. Appl. No. 15/584,169, filed May 2, 2017, dated Jan. 30, 2020, 6 pgs.
Klicpera, Michael Edward; Petition for Ex Parte Reexamination of U.S. Pat. No. 8,347,427, filed Aug. 2, 2019, 516 pgs.
Klicpera, Michael Edward; Petition for Ex Parte Reexamination of U.S. Pat. No. 9,297,150, filed Aug. 2, 2019, 366 pgs.
Klicpera, Michael Edward; Petition for Ex Parte Reexamination of U.S. Pat. No. 9,749,792, filed Aug. 5, 2019, 587 pgs.
Mueller Systems, LLC; Petition for Inter Partes Review of U.S. Pat. No. 8,347,427, filed Oct. 29, 2019, 75 pgs.
Mueller Systems, LLC; Petition for Inter Partes Review of U.S. Pat. No. 9,297,150, filed Oct. 29, 2019, 89 pgs.
Mueller Systems, LLC; Petition for Inter Partes Review of U.S. Pat. No. 9,749,792, filed Oct. 29, 2019, 75 pgs.
New World Encyclopedia; Article entitled: "Thermocouple", located at <https://web.archive.org/web/20081228234252/https://www.newworldencyclopedia.org/entry/Thermocouple>, archived webpage from Dec. 28, 2008, 5 pgs.
Pacific Gas and Electric Company; Article entitled: "SmartMeter System—How it Works", located at <https://web.archive.org/web/20100712031615/https:/www.pge.com/myhome/customerservice/smartmeter/howitworks/>, accessed on Oct. 24, 2019, 3 pgs.
The Free Dictionary; Article entitled: "Remotely", located at <https://web.archive.org/web/20080821060942/http://www.thefreedictionary.com/remotely>, archived webpage from Aug. 21, 2008, 3 pgs.
Wikipedia; Article entitled: "Flow Measurement", located at <https://web.archive.org/web/20071028063648/https://en.wikipedia.org/wiki/Flow_measurement>, archived webpage from Oct. 28, 2007, 4 pgs.
Wikipedia; Article entitled: "Pressure sensor", located at <https://web.archive.org/web/20071117202257/https://en.wikipedia.org/wiki/Pressure_sensor >, archived webpage from Nov. 17, 2007, 4 pgs.
Ball, Marty Scott; Supplemental Notice of Allowance for U.S. Appl. No. 15/584,169, filed May 2, 2017, dated Mar. 17, 2020, 4 pgs.
Ball, Marty Scott; Notice of Allowance for U.S. Appl. No. 15/584,169, filed May 2, 2017, dated Mar. 4, 2020, 11 pgs.
Ball, Marty Scott; Office Action for Mexico patent application No. MX/a/2015/013381, filed May 25, 2012, dated Feb. 5, 2020, 7 pgs.

\* cited by examiner

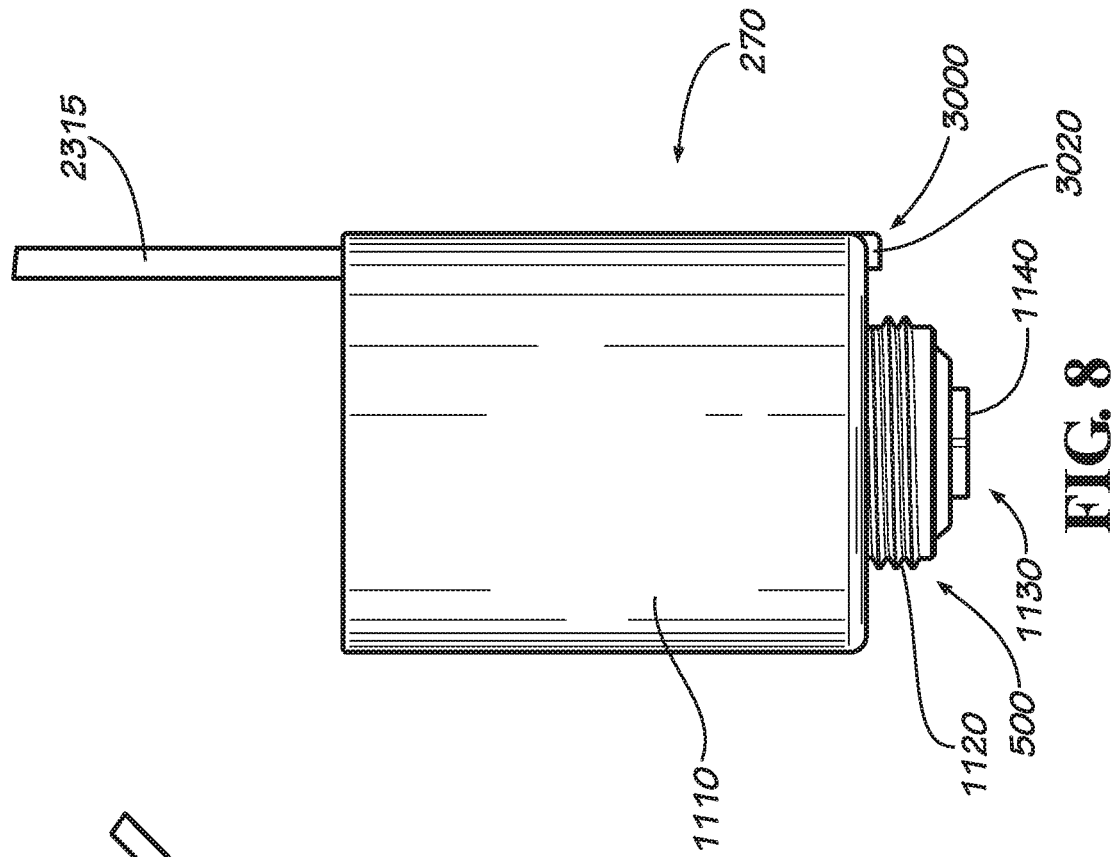
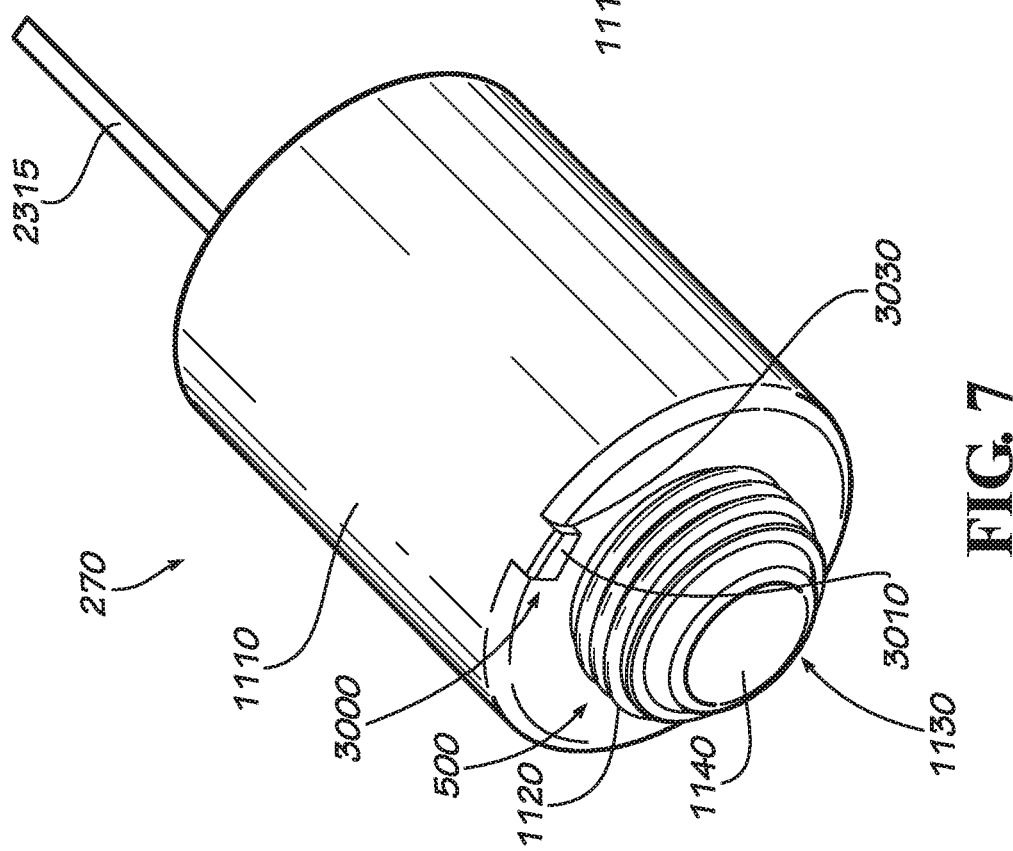

MECHANICAL STOP FOR ACTUATOR AND ORIFICE

CROSS-REFERENCE TO RELATED APPLICATIONS

This application is a continuation of U.S. application Ser. No. 15/288,156, filed Oct. 7, 2016, which is a continuation of U.S. application Ser. No. 14/273,823, filed May 9, 2014, which issued into U.S. Pat. No. 9,494,249, on Nov. 15, 2016, each of which is hereby specifically incorporated by reference herein in its entirety.

TECHNICAL FIELD

This disclosure relates to water control and metering. More specifically, this disclosure relates to actuators for use in a valve meter assembly.

BACKGROUND

Water is typically supplied by a water provider which is usually a municipality. Water providers deliver water to businesses and individuals via piping systems. A piping system could be an upstream piping system, including a system to carry water from a water provider to a meter, or a downstream piping system, including a system to carry water from a meter to a user terminal. Because water providers typically sell water by unit volume, there exists a need to measure water flow to a user terminal to generate a water bill. As used herein, user terminal may include an individual residence, a place of business or any other point of termination of the water flow. Typically, a water meter will be placed in the water supply line between the water source and the user terminal to measure all water flowing to that user terminal. Meters are read and checked against prior readings to determine the total flow of water to the user terminal.

When a water user has not provided payment for water already used, it is typical in the industry for a water provider to discontinue supplying water to the user terminal associated with the water user. Typically, a water provider will install a manual water supply valve in the supply line in anticipation of the need to discontinue water supply. Although the valve may be rarely operated, there are many situations where the valve is operated on a regular basis. Further, a manual valve is standard equipment for water providers and may even be required by statutes in some localities.

Typically, water meters are read manually by water meter readers who are employees or contractors of the water providers. Additionally, water supply valves are manually operated by employees or contractors of the water providers. These manual operations associated with providing water represent a significant cost for a water provider. With the advent of wireless technology, water providers have sought methods and systems for remote reading of water meters and/or remote control of water supply valves.

Mesh networks for remote reading of water meters exist currently. Systems for remotely controlling the water supply valve exist currently. However, these systems are often cumbersome to implement, requiring excavation and replacement of water supply lines to implement a remotely controlled water supply valve. Electronic remote control of valves and reading of meters has been implemented through wired connections. While wireless systems for controlling valves or for reading meters do exist, the cast ferrous materials used to make most water meter housings can interfere with wireless signals, so the wireless equipment often cannot be placed in close proximity to typical meter housings. Moreover, a remotely controlled valve typically involves a separate system and apparatus from a remotely readable water meter. Systems that integrate a shutoff valve and water meter together are often too large to be installed without excavation of the water supply lines and are typically difficult to service if parts fail. Some systems designed to fit into the standard water meter lay-length of a water meter provide inordinate head loss through the system and provide only remote control of the valve and no ability to read the meter remotely. Moreover, wireless water supply valves typically have relatively short operative lives because their operation requires large amounts of energy.

Water meters may include a valve operable with an actuator such as a solenoid or any similar component. The actuator may operate the valve by placing a plunger over an orifice bore defined in the valve, such as in a diaphragm valve. It may therefore be desirable to precisely locate the actuator relative to the orifice bore. This may be accomplished with special tools, for example with a tool that tightens a component on an assembly to a specific torque value, but it may be desired or even required in some applications that the component be installable without such special tools. Incorporating such a feature into the component (or components) itself can have practical benefits for those who purchase, control, and/or service the equipment.

SUMMARY

Disclosed is a valve comprising: a valve cover, the valve cover comprising a solenoid attachment portion defining a threaded solenoid attachment sink and a valve cover mechanical stop, the valve cover mechanical stop protruding from an outer surface of the solenoid attachment portion; and a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop protruding from an outer surface of the solenoid body, the solenoid mechanical stop engageable with the valve cover mechanical stop.

Also disclosed is an assembly comprising: a housing, the housing defining at least one inlet opening, at least one outlet opening, and a channel connecting the at least one inlet opening and the at least one outlet opening; and a valve in communication with the channel and configured to control the flow of water through the assembly, the valve comprising an actuator and a valve cover, a threaded attachment portion of the actuator threadably engageable with the valve cover, the actuator comprising an actuator mechanical stop and the valve cover comprising a valve cover mechanical stop, the valve cover mechanical stop protruding from an outer surface of the solenoid attachment portion and the solenoid mechanical stop protruding from an outer surface of the solenoid body, the actuator mechanical stop rotatably engageable with the valve cover mechanical stop to set the position of the actuator.

Also disclosed is a method of installing an actuator comprising: preparing a valve assembly containing a valve and device housing, the valve comprising a valve cover and an actuator, the valve cover comprising an actuator attachment portion and a valve cover mechanical stop, the actuator comprising an actuator body and an actuator mechanical stop, the valve cover mechanical stop protruding from an outer surface of the actuator attachment portion and the actuator mechanical stop protruding from an outer surface of the actuator body; installing the actuator in the valve cover; and tightening the actuator by rotation until the actuator mechanical stop engages with the valve cover mechanical stop, fixing the position of the actuator with respect to the valve cover.

Also disclosed is a valve comprising: a valve cover, the valve cover comprising a solenoid attachment portion defining a threaded solenoid attachment sink and a valve cover mechanical stop; and a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop engageable with the valve cover mechanical stop; wherein the valve cover mechanical stop and the solenoid mechanical stop are configured to create a sound upon engagement with each other.

Also disclosed is an assembly comprising: a housing, the housing defining at least one inlet opening, at least one outlet opening, and a channel connecting the at least one inlet opening and the at least one outlet opening; and a valve in communication with the channel and configured to control the flow of water through the assembly, the valve comprising: a valve cover, the valve cover comprising a solenoid attachment portion defining a threaded solenoid attachment sink and a valve cover mechanical stop; and a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop engageable with the valve cover mechanical stop; wherein a one of the valve cover mechanical stop and the solenoid mechanical stop is configured to snap into engagement with another of the valve cover mechanical stop and the solenoid mechanical stop.

Also disclosed is a method of installing an actuator, the method comprising: preparing a valve assembly containing a valve and device housing, the valve comprising a valve cover and an actuator, the valve cover comprising an attachment portion and a valve cover mechanical stop, the actuator comprising a body and a mechanical stop; installing the actuator in the valve cover until the mechanical stop of the actuator engages with the valve cover mechanical stop; confirming engagement of the mechanical stop of the actuator with the valve cover mechanical stop via a sound created by contacting the mechanical stop of the actuator with the valve cover mechanical stop.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 7 is a perspective view of a solenoid included in the valve meter device of the valve meter assembly of FIG. 1.

FIG. 8 is a side view of the solenoid of FIG. 7.

DETAILED DESCRIPTION

Disclosed is a valve meter assembly and associated methods, systems, devices, and various apparatus. It would be understood by one of skill in the art that the disclosed valve is described in but a few exemplary embodiments among many. No particular terminology or description should be considered limiting on the disclosure or the scope of any claims issuing therefrom.

A valve meter assembly in which the presently disclosed valve could be incorporated is shown in U.S. Patent Publication No. 2012-0305084, published Dec. 6, 2012, which is hereby incorporated by reference in its entirety.

Figure 1:
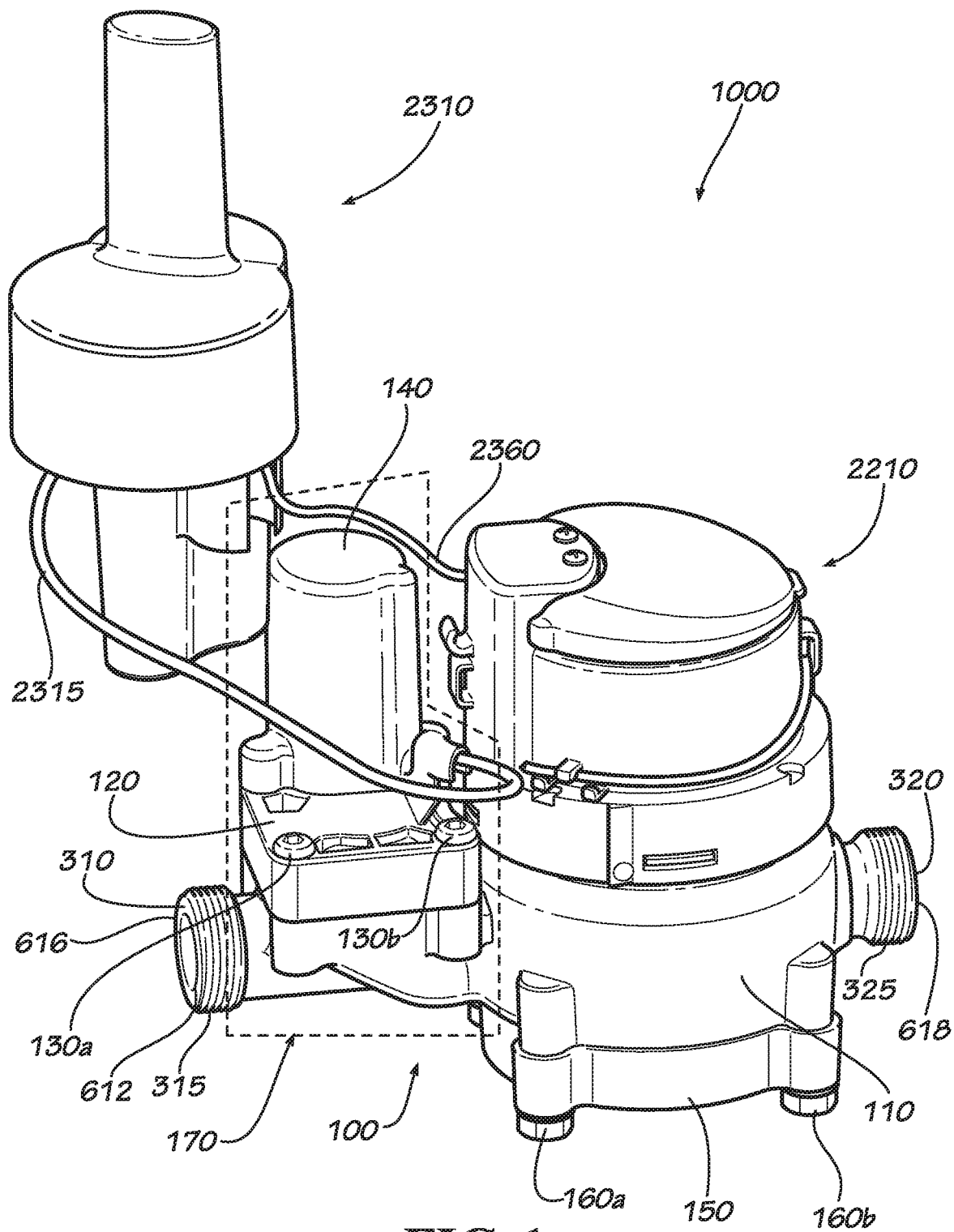
FIG. 1 is a perspective view of a valve meter assembly including a valve meter device, a register device, and a wireless communication unit included in accord with one embodiment of the disclosure.

One embodiment of a valve meter assembly 1000 is disclosed and described in FIG. 1. FIG. 1 shows valve meter assembly 1000 with a register device 2210 connected to the top of a device housing 110 of a valve meter device 100. Various embodiment of valve meter assembly 1000 also include a communication device. The communication device in some embodiments may be a wireless communication unit 2310 connected to a solenoid 270 (shown in FIG. 2) using a solenoid lead wire assembly 2315. The solenoid 270 is an actuator. In various embodiments, other actuators may be present in place of the solenoid 270. In the current embodiment, the wireless communication unit 2310 is part of a mesh network where the mesh network includes the remotely located communicator. The remotely located communicator may be operated by a municipality, a technician, a service provider, or another entity. The remotely-located communicator may be any communication device or system including a computer, a server, a gateway, another valve meter assembly, a handheld device, a mesh network, or any other device or system capable of communicating with the wireless communication unit 2310. In some embodiments, a bracket (not shown) is provided for attachment of the wireless communication unit 2310. One such bracket is described in FIG. 23 of aforementioned U.S. Patent Publication No. 2012-0305084.

The device housing 110 of valve meter device 100 forms the main body through which water will flow, from inlet 310 to outlet 320. The threaded connections shown are inlet threaded portion 315 and outlet threaded portion 325, although other types of connections are considered within the scope of this disclosure. A valve cover 120 is attached to the device housing 110 using valve cover screws 130a-d (130c,d shown in FIG. 2). A solenoid tamper cover 140 is attached to the top of the valve cover 120. A bottom plate 150 is attached to the device housing 110 with bottom plate screws 160a-d (160c shown in FIG. 2, 160d not shown). In this disclosure, references to "top", "bottom", "down", "up", "downward", or "upward" refer to the valve meter assembly 1000 as oriented in FIG. 1. Various features of the valve meter assembly 1000 may be altered, reoriented, reconfigured, replaced, rotated, or moved in alternative embodiments. No one configuration is intended to be limiting on this disclosure.

Figure 2:
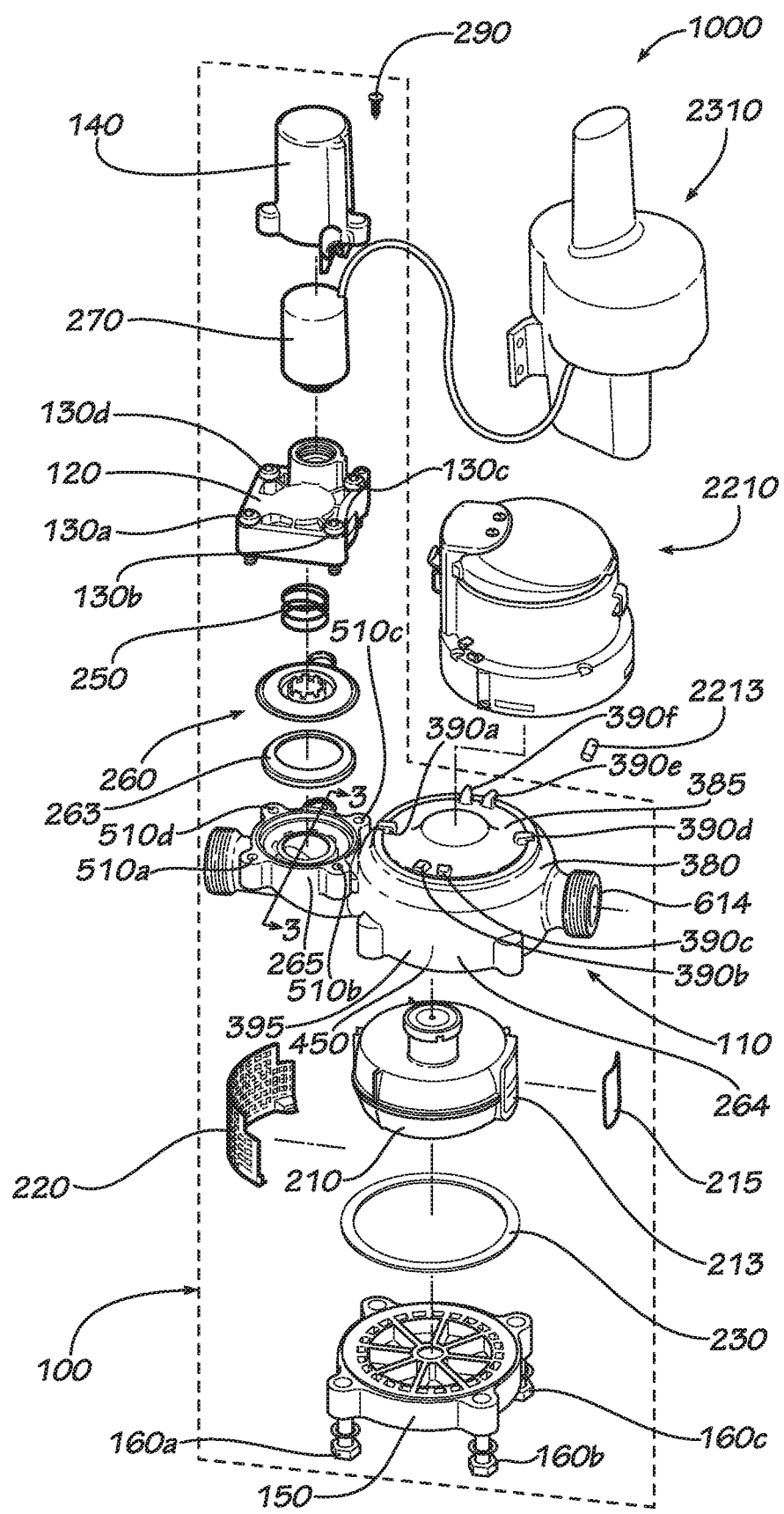
FIG. 2 is an exploded view of the valve meter assembly of FIG. 1.

The valve meter device 100 includes a valve 170 and a meter 210 (shown in FIG. 2). The valve 170 is partially integrated with the device housing 110 and includes the valve cover 120 screwed onto the device housing 110 to enclose some components of the valve 170 inside a cavity defined between the valve cover 120 and the device housing 110. Although the current embodiment includes a partially integrated construction with a separately attached cover, various embodiments are included in this disclosure and may include a plastic welded assembly, separate valve and device housing subassemblies connected together via plastic welding, or separate valve and device housing subassemblies connected together mechanically, among others.

FIG. 2 is an exploded view of the valve meter assembly 1000 including valve meter device 100, register device 2210, and wireless communication unit 2310. Register pin 2213 of register device 2210 is also shown in FIG. 2. The device housing 110 of valve meter device 100 includes a meter portion 264 and a valve portion 265. The device housing 110 and bottom plate 150 are configured to enclose meter 210 and a strainer retainer 220 in the meter portion 264. The bottom plate 150 is attached to the device housing 110 with bottom plate screws 160a-d (160d not shown). A meter gasket 230 is inserted between the bottom plate 150 and the device housing 110. The meter 210 in the current embodiment is a nutating disc displacement flow meter. Other meter types may be used with the valve meter device 100. The meter 210 has a metering inlet (not shown) and a metering outlet 213 located proximate to each other. The metering outlet 213 is surrounded by a metering outlet rubber gasket 215.

The valve cover 120 and the valve portion 265 of the device housing 110 enclose a spring 250, a diaphragm assembly 260, and a support ring 263. The solenoid tamper cover 140 encloses a solenoid 270 onto the valve cover 120. The valve cover 120 includes a valve orifice cylinder 280 (shown in FIG. 4) which in the disclosed embodiment is not a separate component but rather a cylindrical boss with an orifice bore 285 concentric to valve orifice cylinder 280 and extending down from the top of valve orifice cylinder 280. Valve orifice cylinder 280 is built into the solenoid attachment portion 820 of the valve cover 120. In various embodiments, valve orifice cylinder 280 could be a separate steel cylinder (disclosed in aforementioned U.S. Patent Publication No. 2012-0305084) with a cylindrical orifice bore extending its entire vertical length. In various embodiments, the orifice bore 285 could be of a constant diameter or it could vary in diameter along its length. In the current embodiment, the orifice bore 285 has a narrower inside diameter at the top than at the bottom. The valve orifice cylinder 280 has a cylindrical shape in the current embodiment, but the valve orifice cylinder 280 may be various shapes in various embodiments.

The solenoid 270 is attached to the valve cover 120. The valve orifice cylinder 280 interacts with the solenoid 270 to change water flow through the media channel 520 (shown in FIG. 3) when the solenoid 270 is placed in an "open" or a "closed" position. A solenoid tamper cover screw 290 provides the attachment of the solenoid tamper cover 140 to the valve cover 120.

In various embodiments, the spring 250 may not be required for valve operation. Other parts of the valve 170, including the solenoid tamper cover 140 or support ring 263, may not be present in various embodiments of the valve meter device 100. The valve cover 120 and the valve portion 265 of the device housing 110 are screwed together to enclose the spring 250, support ring 263, and the diaphragm assembly 260 using valve cover screws 130a,b,c,d. Spring 250 may not be present in various embodiments.

Detailed embodiments of register device 2210 and wireless communication unit 2310 are described in aforementioned U.S. Patent Publication No. 2012-0305084.

The device housing 110 has an inlet 310 and an outlet 320 (shown in FIG. 1). Water flows through the device housing 110 by flowing into the inlet 310 and out of the outlet 320. The inlet 310 includes an inlet end 616 (shown in FIG. 1), an inlet threaded portion 315 (shown in FIG. 1), and an inlet opening 612 (shown in FIG. 1). The outlet 320 includes an outlet end 618 (shown in FIG. 1), an outlet threaded portion 325 (shown in FIG. 1), and an outlet opening 614 (shown in FIG. 2). The inlet threaded portion 315 and the outlet threaded portion 325 allow for attachment to a piping system, including an upstream piping system or a downstream piping system or both. Water flows into the inlet 310 from a provider or water source and out of the outlet 320 to a home, office building, or other user terminal. Both the inlet 310 and the outlet 320 are attachable to the piping system via the inlet threaded portion 315 and outlet threaded portion 325, respectively, with a coupling nut (not shown). Details on embodiments of the basic internal structure of the device housing 110 and surrounding components may be found in aforementioned U.S. Patent Publication No. 2012-0305084.

To reduce head loss, the valve 170 (including the valve portion 265) and the meter 210 (placed in the meter portion 264) are oriented such that at least a portion of each of the valve 170 and the meter 210 touch an imaginary line drawn between the inlet 310 and the outlet 320 thereby forming an "in line" configuration. The "in line" configuration is not achieved by staggering valve 170 and the meter 210, as such staggering may result in unacceptable head loss. However, the "in line" configuration does not indicate that components of the valve meter device 100, including the meter 210 and valve 170, are located along the same horizontal plane. Should components or features, including the valve 170 and the meter 210, of the valve meter device 100 be staggered such that the components are not along the same horizontal plane, such a configuration typically is arranged to accommodate other requirements, such as an uneven piping system or multiple inlet or outlet configurations, and not to address the requirement of fitting the valve meter device 100 into a standard water meter lay-length.

The device housing 110 is dimensioned so that it can fit within a standard water meter lay-length. The standard water meter lay-length of a standard water meter is designated in various industry standards documents, including the American Water Works Association (AWWA). The AWWA C700 standard requires 7.5 inches standard water meter lay-length for meters with ⅝-inch piping diameter. Other AWWA standards, such as C708 and C710, also specify the same laying lengths for meters of like sizes. Additional details may be found in aforementioned U.S. Patent Publication No. 2012-0305084.

Also shown in FIG. 2, a top portion 380 of the meter portion 264 includes a register connection interface 385. The register connection interface 385 includes several teeth 390a,b,c,d,e,f designed to attach the separate register device 2210 to the top portion 380. A bottom portion 395 of the meter portion 264 is configured to accept the bottom plate 150 attaching to the device housing 110. The bottom portion 395 and the bottom plate 150 may be connected via a threaded interaction, a screw and bore attachment, or a welded attachment, among others. For maximum wireless communication capabilities, the device housing 110 may be composed of brass, bronze, plastic, aluminum, or other non-ferrous material. The device housing 110 may also be made of ferrous materials based on the specific application.

The meter portion 264 of the device housing 110 is sized to define a meter cavity 450. Although the current embodiment of the meter portion 264 is cylindrical, the meter portion 264 need not be a specific shape, but need only accommodate the meter 210. The thickness of each of the walls of meter portion 264 is sized to accommodate the water pressure of the piping system and may be variable or constant depending on the method of manufacture and other factors. The meter portion 264 also includes four threaded bottom plate attachment bores (not shown) for attachment of the bottom plate 150 with the bottom plate screws 160a,b,c,d.

The valve portion 265 includes four threaded valve cover bores 510a,b,c,d for attachment of the valve cover 120 to the valve portion 265 of the device housing 110. In the current embodiment, the valve cover 120 is attached using four valve cover screws 130a,b,c,d that attach through the valve cover 120 to each valve cover bore 510a,b,c,d. As noted above, the attachment could also be achieved using welding, which would obviate any need for valve cover bores 510a,b,c,d or valve cover screws 130a,b,c,d.

Figure 3:
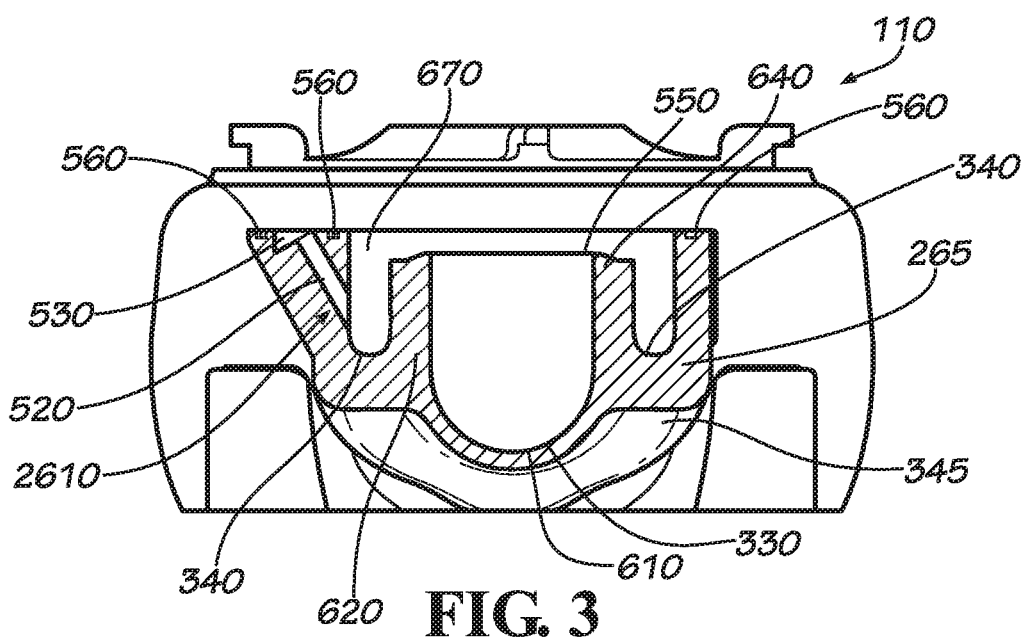
FIG. 3 is a sectional view of a device housing of the valve meter assembly of FIG. 1 taken through a valve portion of the device housing along line 3-3 in FIG. 2.

Shown in FIG. 3 is a sectional view of valve portion 265 of the device housing 110 also showing a media channel 520 which is a bore that extends from the valve outlet portion 340 to a media channel relief 530 in the device housing 110. A diaphragm ring recess 560 lines the top of the valve portion 265 and the media channel relief 530. The beveled edge 550 seals the valve 170 in operation. Also shown in FIG. 3 are horizontal portion 610, vertical portion 620, slanted bottom portion 345, top edge portion 640, and valve inlet portion 330.

Figure 4:
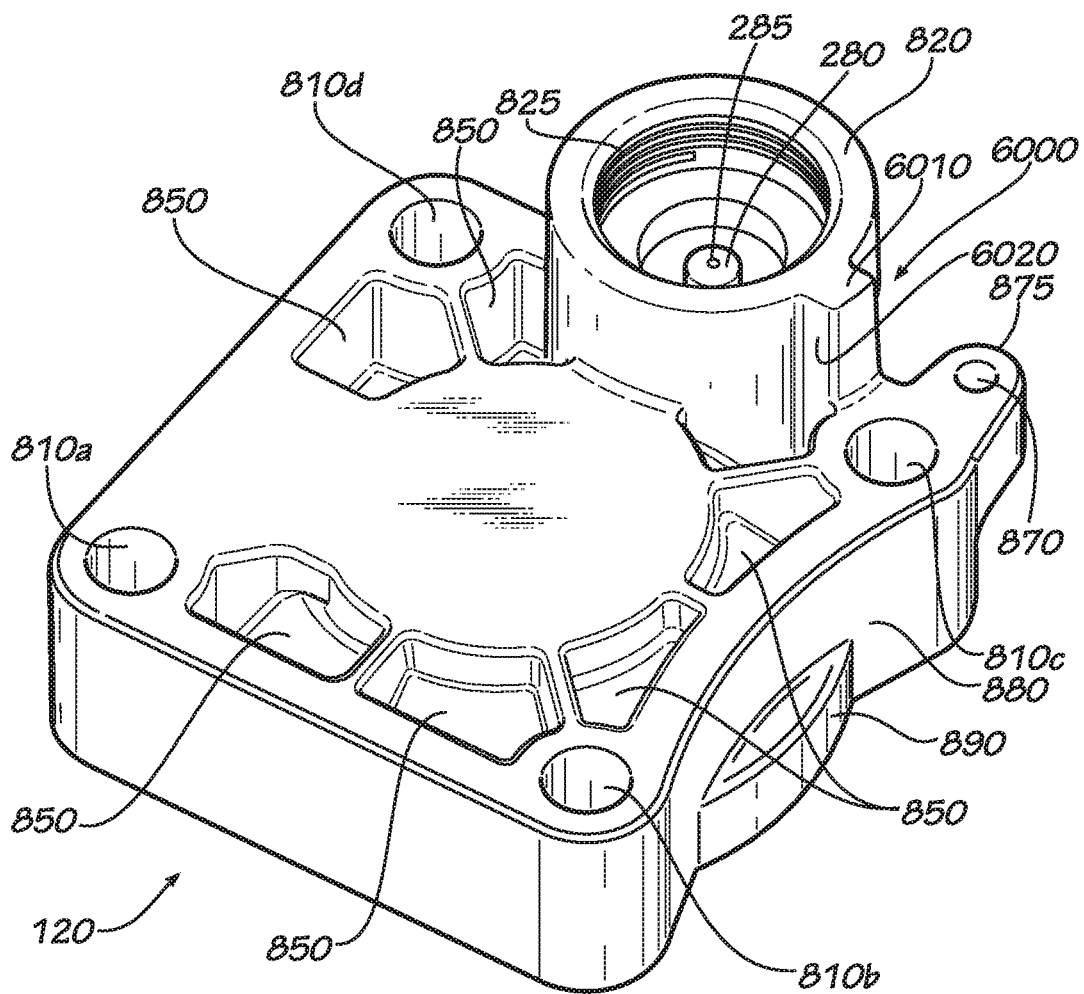
FIG. 4 is a perspective view of a valve cover of the valve meter device of the valve meter assembly of FIG. 1.
Figure 5:
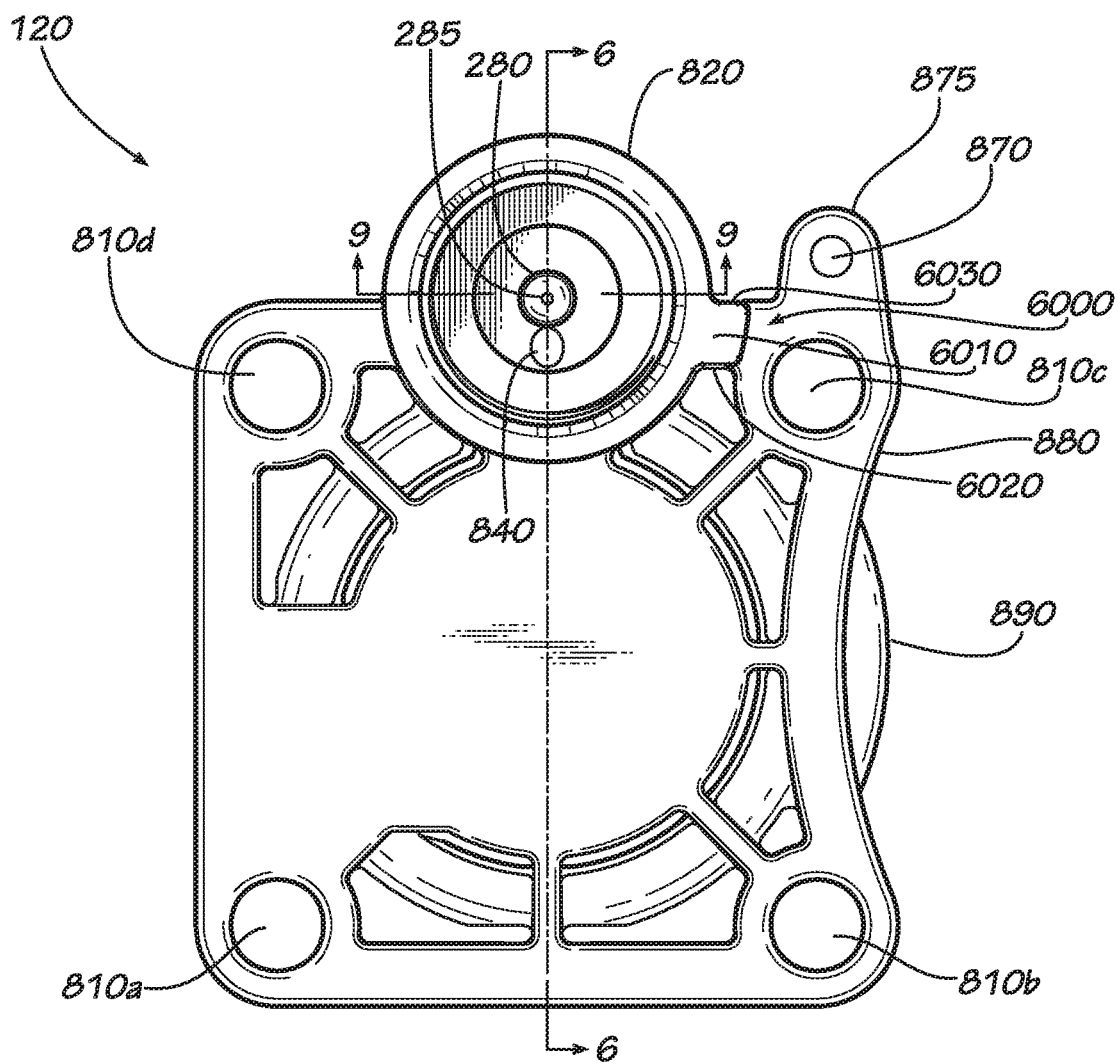
FIG. 5 is a top view of the valve cover of FIG. 4.

FIG. 4 is a perspective view and FIG. 5 is a top view of one embodiment of valve cover 120. Four screw bores 810a,b,c,d are located at the corners of the valve cover 120. A solenoid attachment portion 820 is a cylindrical boss including a solenoid attachment sink 825 on the inside of the boss, the solenoid attachment sink 825 defining a depressed area in the solenoid attachment portion 820 configured to accepted at least a portion of solenoid 270. This solenoid attachment sink may have a threaded portion and be identified as a threaded solenoid attachment sink. The valve cover attachment portion may have a threaded portion to match with the threaded solenoid attachment sink and may be identified as a threaded valve cover attachment portion. A valve orifice cylinder 280 defines an orifice bore 285 which is connected to a valve cover media channel 830 (shown in FIG. 6). The valve orifice cylinder 280, orifice bore 285, and valve cover media channel 830 are aligned with the center of the solenoid attachment sink 825 in the current embodiment and are aligned with the media channel 520 (shown in FIG. 3) of the device housing 110 when the valve meter device 100 is assembled. A valve cavity media channel 840 (shown in FIG. 5) is also shown in the solenoid attachment portion 820. The valve cover 120 in the current embodiment also includes molded recesses 850. In addition, a threaded solenoid cover screw bore 870 is located in a lug 875. Although the valve cover 120 is about square in shape, one side of the valve cover 120 includes a curve 880. The curve 880 is included to provide clearance for the register device 2210 to be placed on the valve meter device 100. A countercurve protrusion 890 is proximate the bottom of the curve 880 to accommodate the diaphragm ring recess 930.

Extending from the outer edge of solenoid attachment portion 820 toward the side of the valve cover including lug 875 and screw bore 810c is valve cover mechanical stop 6000. Valve cover mechanical stop 6000 includes top 6010, front 6020, and rear 6030 (shown in FIG. 5). Rear 6030 in the current embodiment is aligned with the three o'clock position when viewing the top of the valve cover 120 with the solenoid attachment portion 820 at the upper position on the valve cover 120.

Figure 6:
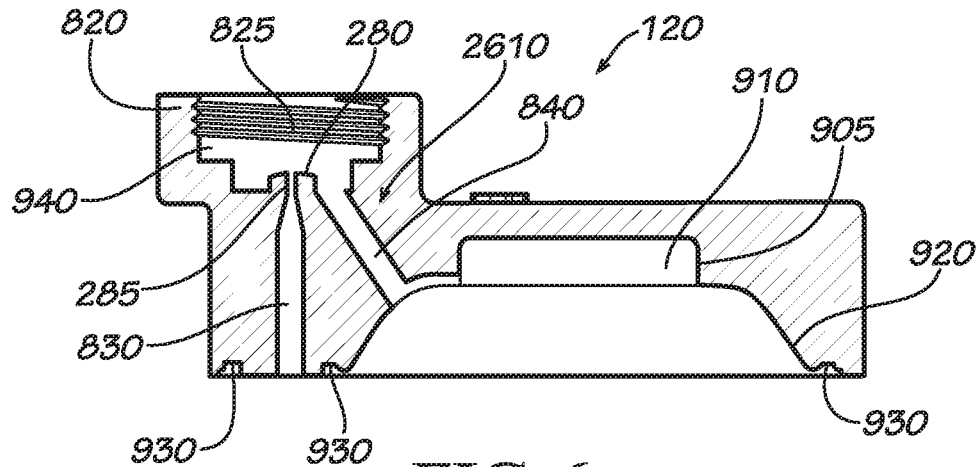
FIG. 6 is a sectional view of the valve cover of FIG. 4 taken along line 6-6 in FIG. 5.

As illustrated in the section view of the valve cover 120 in FIG. 6, the valve cover 120 includes a valve cavity 905. The valve cavity 905 and the valve portion 265 (shown in FIG. 3) enclose components of the diaphragm assembly 260 (shown in FIG. 2). The valve cavity 905 and the valve portion 265 may also enclose the spring 250 and support ring 263 (both shown in FIG. 2). The valve cavity 905 also includes a valve recess 910 and a valve bonnet 920, which together are shaped to accept the diaphragm assembly 260 and the spring 250 and the support ring 263. The valve cover 120 also includes a diaphragm ring recess 930 shaped to align with the diaphragm ring recess 560.

The solenoid attachment portion 820 is dimensioned to define a solenoid chamber 940 between the solenoid 270 and the valve cover 120 when the solenoid 270 is attached to the valve cover 120. The valve cavity media channel 840 connects the valve cavity 905 with the solenoid chamber 940. Although the valve cavity media channel 840 is shown to connect with both the valve recess 910 and a valve bonnet 920 in the current embodiment, the valve cavity media channel 840 may connect to any portion of the valve cavity 905, including the valve recess 910. Because the valve cover media channel 830 is aligned with the center of the solenoid attachment portion 820 and solenoid attachment sink 825, the valve cover media channel 830 connects to the orifice bore 285 to the solenoid chamber 940. Valve orifice cylinder 280 is positioned at the top of valve cover media channel 830 and is part of valve cover 120 but may be manufactured as a separate component in other embodiments and added to valve cover 120 by welding, screwing, interference fit and any one of a number of other commonly available fastening methods FIG. 7 shows a perspective view and FIG. 8 shows a side view of one embodiment of the solenoid 270 of the valve meter device 100. The solenoid 270 includes a solenoid body 1110, a valve cover attachment portion 500 incorporating threaded attachment portion 1120, plunger 1130, and solenoid lead wire assembly 2315. The plunger 1130 includes a shaft portion 1135 (not shown) and an interface portion 1140. Although the solenoid in the current embodiment is designed to be attached via threaded interaction, other attachment means are contemplated, including glue, welding, snap-in or click-in, and screw bore attachments among others. The solenoid tamper cover 140 (shown in FIGS. 1 and 2) covers the solenoid 270 when the valve meter device 100 is assembled. When the valve meter device 100 is assembled, the interface portion 1140 of the plunger 1130 may contact and seal the orifice bore 285, as will be described later.

Also shown in FIG. 7 and FIG. 8 is a solenoid mechanical stop 3000 having a bottom 3010, a front 3020 (shown in FIG. 8), and a rear 3030. In the current embodiment, the solenoid mechanical stop 3000 is part of solenoid body 1110 and is located at the bottom outer edge of the solenoid body 1110 and protrudes from an outer surface of solenoid body 1110. In the current embodiment, the height of the solenoid mechanical stop 3000 is sized so as not to interface with the valve cover mechanical stop 6000 (shown in at least FIGS. 4, 10, and 11) until there is less than 45 degrees of rotation of solenoid 270 remaining with respect to solenoid attachment sink 825 to fully tighten the solenoid 270 in the solenoid attachment sink 825. In the current embodiment, valve cover mechanical stop 6000 protrudes from an outer surface of the solenoid attachment portion 820 of valve cover 120. In various other embodiments, the valve cover mechanical stop 6000 may protrude from inside the solenoid attachment sink 825 engageable with the solenoid mechanical stop 3000 protruding from the valve cover attachment portion 500. In these other embodiments, the valve cover mechanical stop 6000 and solenoid mechanical stop 3000 may not be visible once the solenoid is installed in the valve cover 120. In various embodiments, there is a thread lead-in point at which the threads of the threaded attachment portion 1120 of valve cover attachment portion 500 begin to rotatably engage with the threads of solenoid attachment sink 825. A radial dimension of the solenoid mechanical stop 3000 is sized so as to interface with the valve cover mechanical stop 6000 but rotate freely about solenoid attachment portion 820 of valve cover 120. Front 3020 and rear 6030 are co-planar when the threaded attachment portion 1120 of solenoid 270 is fully engaged inside solenoid attachment sink 825 and front 3020 comes in contact with rear 6030 (shown in FIG. 10). By restricting further rotation of solenoid 270 inside solenoid attachment sink 825, the gap between the interface portion 1140 of plunger 1130 of solenoid 270 can be precisely set by preventing over-tightening or over-torqueing of threaded attachment portion 1120 of valve cover attachment portion 500 inside solenoid attachment sink 825.

Figure 9:
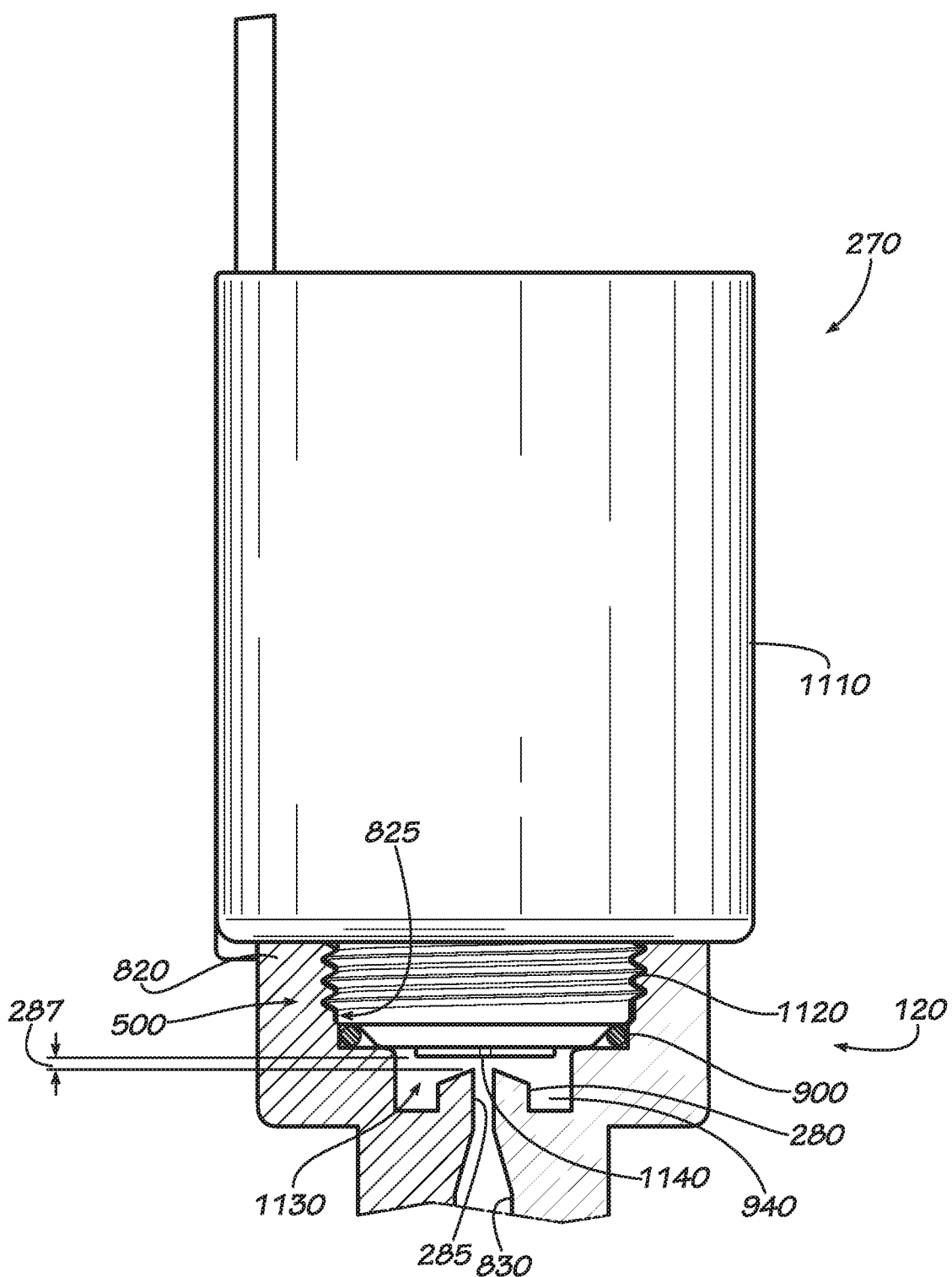
FIG. 9 is a sectional view of the valve cover of FIG. 4 taken along line 9-9 in FIG. 5 with the solenoid of FIG. 7.

FIG. 9 is a sectional view of valve cover 120 also showing a side view of solenoid 270 as seated in valve cover 120. In between solenoid 270 and valve cover 120 at the bottom of solenoid attachment sink 825 is gasket 900. Gasket 900 may be made from any flexible material including but not limited to rubber, EPDM, or silicone, and is sized to prevent water penetration into any space that may remain between solenoid attachment sink 825 and valve cover attachment portion 500 when solenoid 270 is properly seated in solenoid attachment sink 825. Interface portion 1140 of plunger 1130 is shown spaced away from orifice bore 285 defined in valve orifice cylinder 280. As described in a similar embodiment in U.S. Patent Publication No. 2012-0305084, valve 170 is a pilot-operated valve and will shut off the flow of fluid through the valve 170 when valve cover media channel 830 is sealed off from solenoid chamber 940 when interface portion 1140 of plunger 1130 of solenoid 270 comes in contact with orifice bore 285 of valve orifice cylinder 280. In the absence of mechanical stops to precisely set the height of interface portion 1140 of plunger 1130 of solenoid 270 with respect to orifice bore 285 of valve orifice cylinder 280, solenoid 270 may not be fully tightened or it may be over-tightened in solenoid attachment sink 825. If solenoid 270 is not fully tightened, gap 287 between interface portion 1140 and orifice bore 285 may not completely close when valve 170 receives a valve control signal to close, and therefore operation of valve 170 and therefore flow through valve 170 may be affected. In this case, for example, water may continue to flow through valve 170 even though valve 170 has received a valve control signal to turn off the flow. If solenoid 270 is over-tightened—and this is possible even though solenoid body 1110 comes in contact with solenoid attachment portion 820—gap 287 between interface portion 1140 and orifice bore 285 may remain partially or completely closed even when valve 170 receives a valve control signal to open, and therefore operation of valve 170 and therefore flow through valve 170 may be affected. In this case, for example, water flow through valve 170 may be partially or completely restricted even though valve 170 has received a valve control signal to open.

Figure 10:
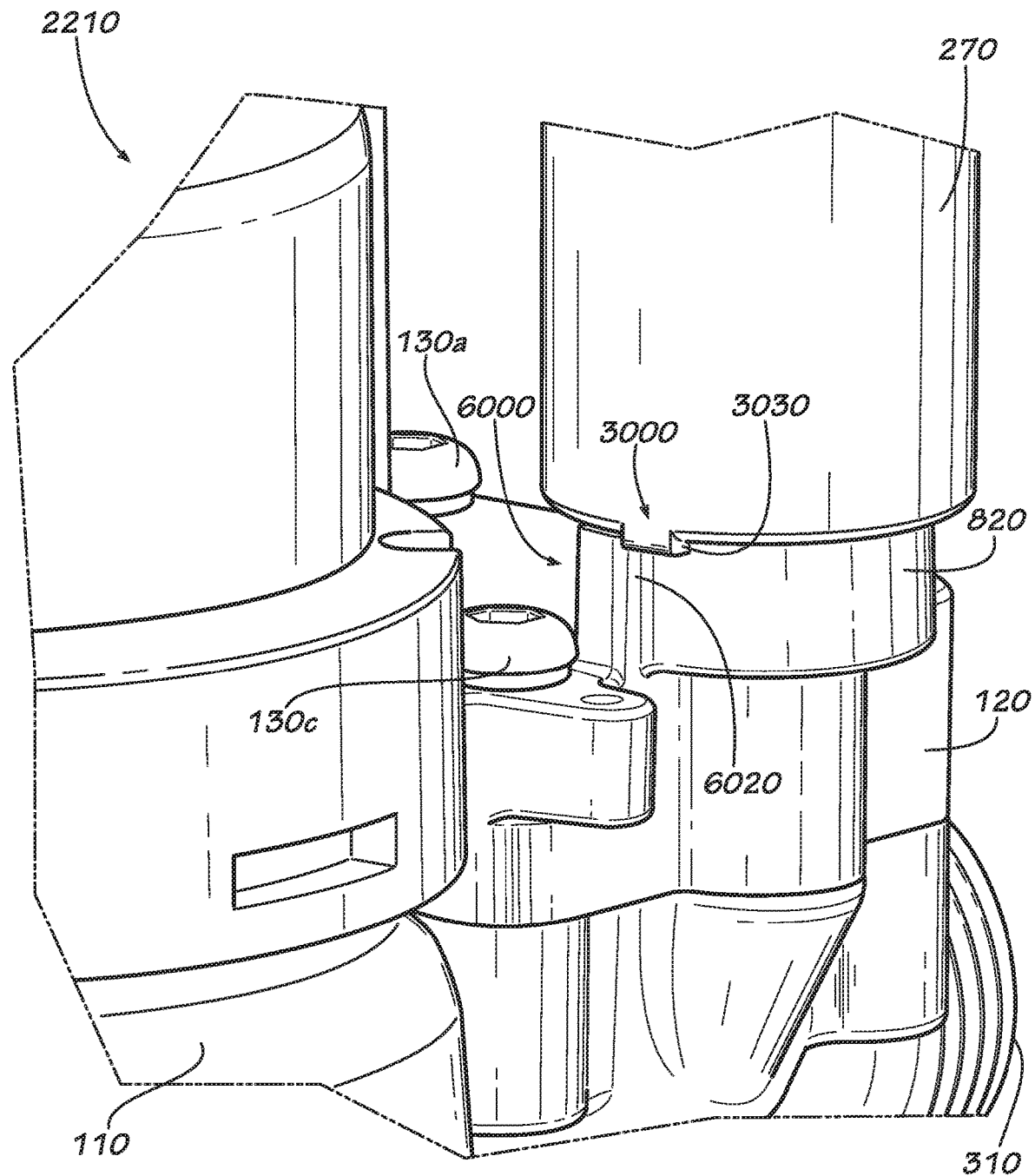
FIG. 10 is a detail perspective view of the valve meter assembly of FIG. 1 at the interface between the solenoid and valve cover as viewed from a position higher than the valve cover.
Figure 11:
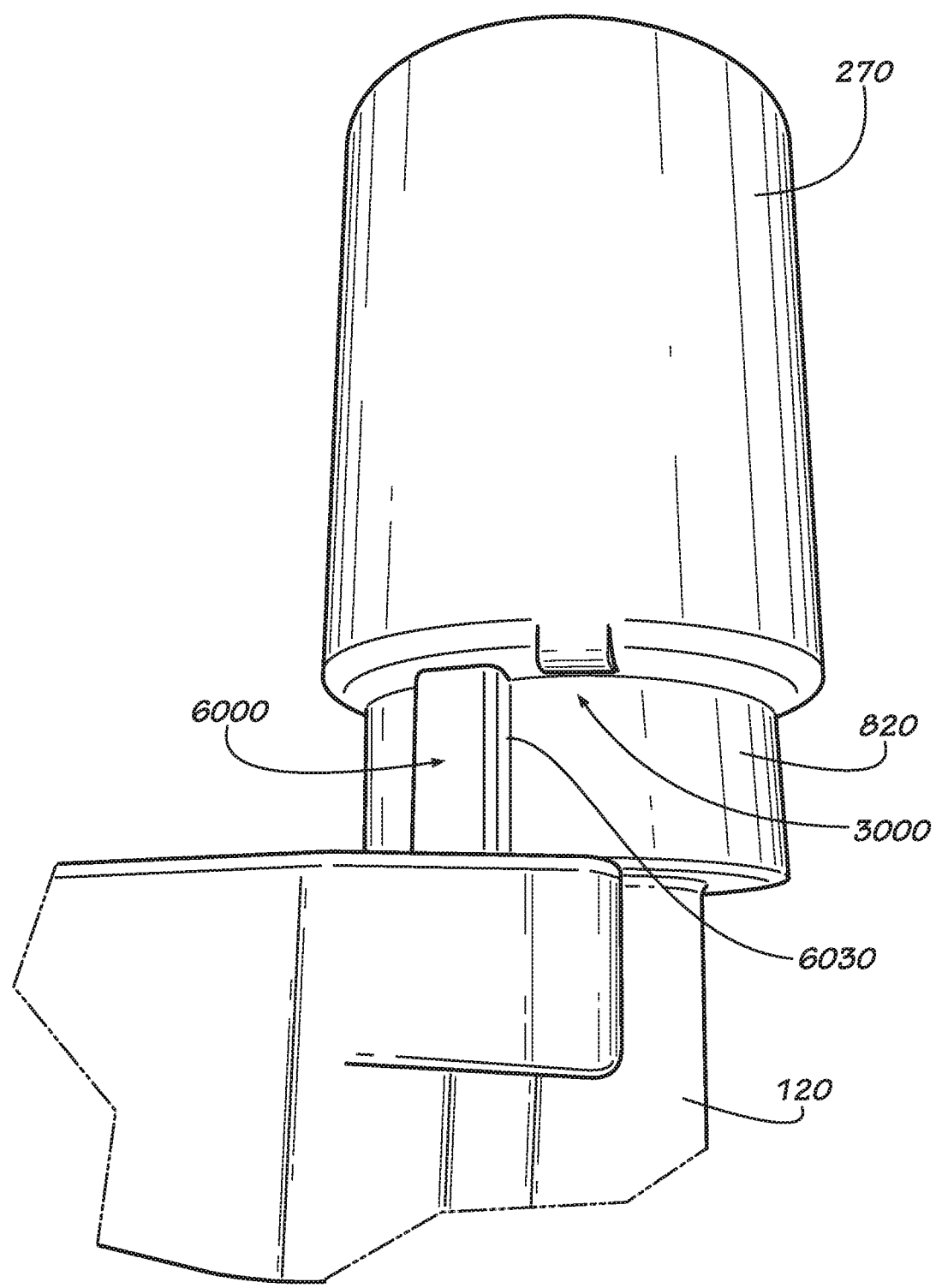
FIG. 11 is a perspective view of the valve meter assembly of FIG. 1 at the interface between the solenoid and valve cover as viewed from a position lower than the solenoid.

FIG. 10 and FIG. 11 show two different perspective views of solenoid 270 with solenoid mechanical stop 3000 engaged with valve cover mechanical stop 6000 of valve cover 120 as in FIG. 10 or in close proximity with each other as in FIG. 11.

Figure 12:
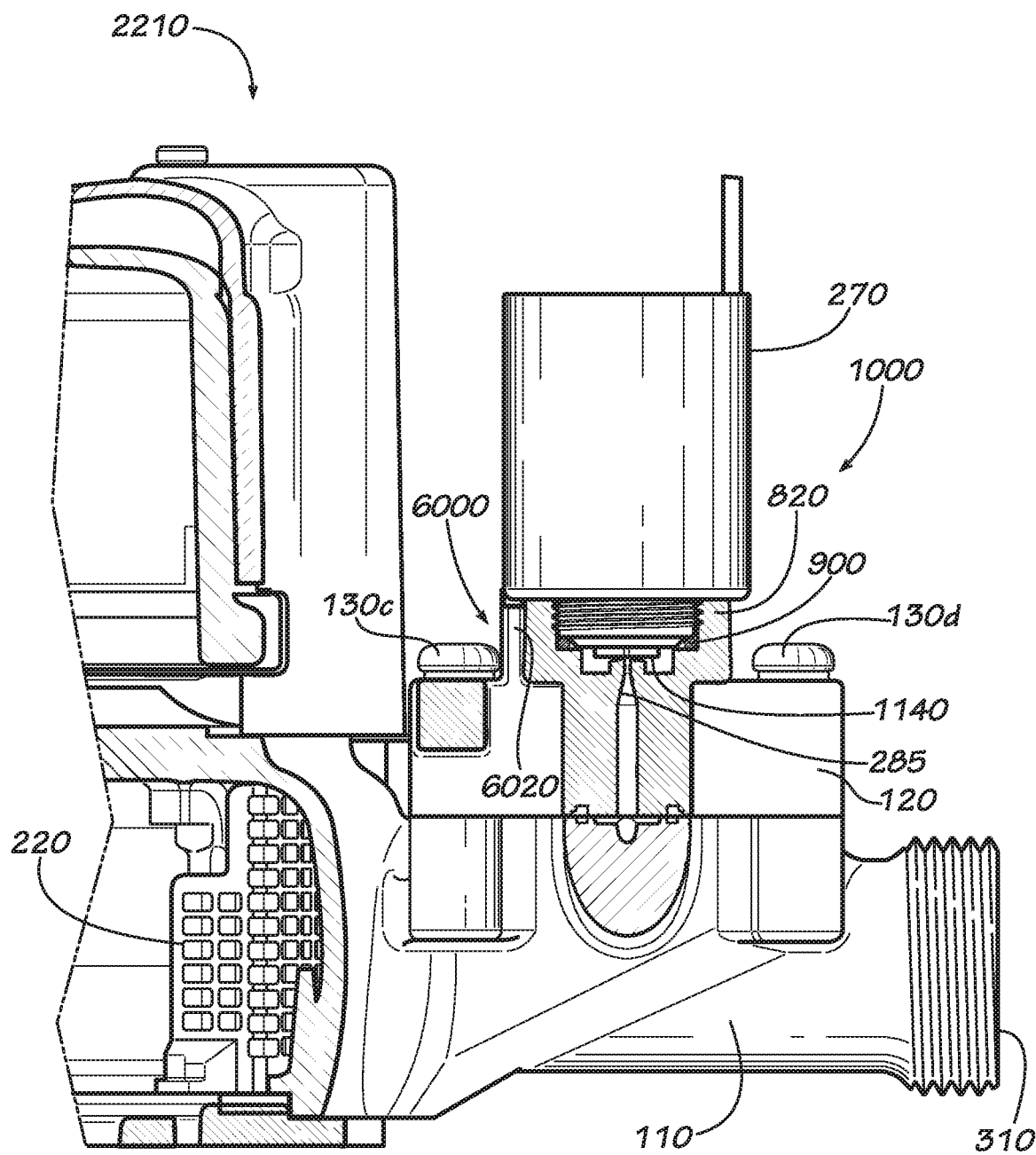
FIG. 12 is a side view of the valve meter assembly of FIG. 1, including a sectional view of the device housing and valve cover taken in a plane proceeding through the center axis of the solenoid of FIG. 7 and also parallel to a line extending from the inlet of the valve meter assembly to the outlet of the valve meter assembly.

FIG. 12 is side view of the valve meter assembly 1000 with a sectional view of the valve cover 120 and the device housing 110. Valve cover mechanical stop 6000 can be seen extending from valve cover 120 between solenoid attachment portion 820 and valve cover screw 130c. Interface portion 1140 of plunger 1130 can be seen covering orifice bore 285.

In various embodiments, the engagement of solenoid mechanical stop 3000 and/or valve cover mechanical stop 6000 may be accompanied by a tactile and/or audible snap or click or other sound to confirm for someone who is building or servicing or otherwise handling the valve 170 that engagement has occurred. This engagement of the solenoid mechanical stop 3000 and/or valve cover mechanical stop 6000 may also be accompanied by a visual indication. This visual indication may come in the form of front 3020 of solenoid mechanical stop 3000 physically interfacing with rear 6030 of valve cover mechanical stop 6000 such that no gap is visible between front 3020 and rear 6030.

Figure 13:
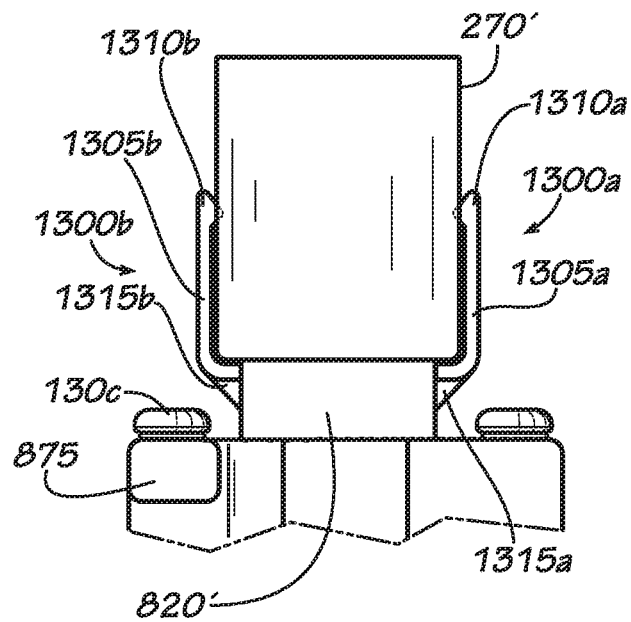
FIG. 13 is a side view of a solenoid attached to a valve cover of another embodiment of a valve meter assembly taken from the same position as FIG. 9.

FIG. 13 is a side view of another embodiment of valve 170, wherein the threaded attachment portion 1120 and solenoid attachment sink 825 of the above-described embodiment are replaced with a plug connection and socket connection, respectively, neither requiring threads and wherein the solenoid 270' is precisely positioned and secured with valve cover mechanical stops 1300*a,b*. Valve cover mechanical stops 1300*a,b* function as snap levers and are incorporated into valve cover 120'. The plug connection of solenoid 270' is so named because it defines a cylindrical structure at one end of solenoid 270' that fits inside the socket connection of valve cover 120'. Valve cover mechanical stops 1300*a,b* include bend portion 1305*a,b* and engagement portion 1310*a,b*. In various embodiments, valve cover mechanical stop 1300*a,b* may be considered a snap lever because it functions as a lever—with a lever arm represented by bend portion 1305*a,b* rotatable about a pivot—and snaps into position during engagement with solenoid mechanical stop 1320*a,b* although engagement may or may not be accompanied by an audible snap. Gusset 1315*a,b* is used to reinforce the base of each valve cover mechanical stop 1300*a,b* by increasing the area of attachment of valve cover mechanical stops 1300*a,b* to solenoid attachment portion 820' of valve cover 120' while still providing clearance for valve cover screws 130*c,d*. Two valve cover mechanical stops 1300*a,b* are shown in the current embodiment with a plug connection (not shown) and socket connection (not shown) similar in size to the threaded variation, but in other embodiments it may be desirable to have more than two valve cover mechanical stops 1300*a,b* or to have valve cover mechanical stops of a different size and shape and engagement method depending on the desired security of the engagement, the system water pressure, and other factors. The security of the engagement could be changed by changing the stiffness and quantity of the valve cover mechanical stops and the shape of the engagement portion, for example. Additionally, it may be desirable to have a deeper or taller attachment socket and/or attachment plug to further stabilize the assembled solenoid 270'.

Figure 14:
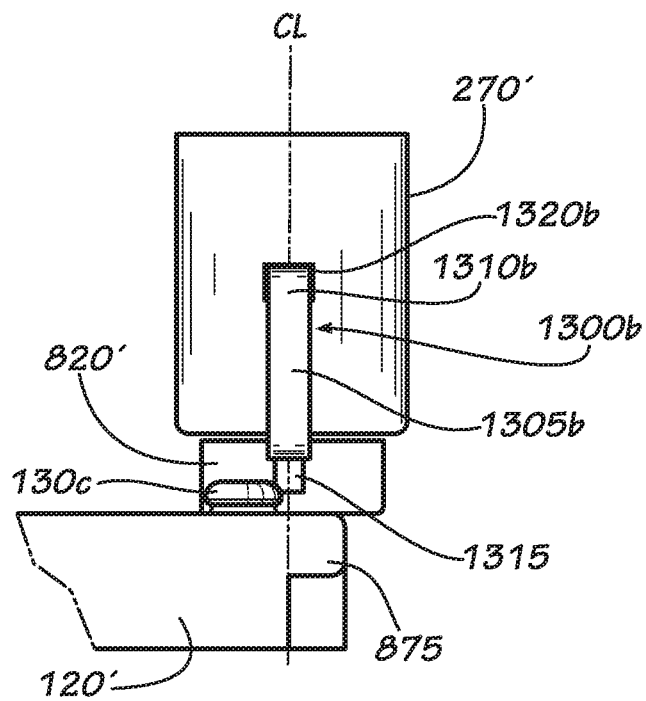
FIG. 14 is another side view of the solenoid and valve cover of the valve meter assembly of FIG. 13.

FIG. 14 is another side view of the valve 170 shown in FIG. 13. Shown is valve cover mechanical stop 1300*b* (1300*a* not shown) and also solenoid mechanical stop 1320*b* (1320*a* not shown). Solenoid mechanical stop 1320*a,b* may be considered a detent because it holds valve cover mechanical stop 1300*b* and therefore also solenoid 270' in position. Solenoid mechanical stops 1320*a,b* in the disclosed embodiment have a height, width, and depth that is large enough to accommodate the engagement portion 1310*a,b* of valve cover mechanical stops 1300*a,b*. However, solenoid mechanical stops 1320*a,b* could be replaced with a single groove or recess (not shown) around the full perimeter of the solenoid 270' in applications where it might be desirable to install solenoid 270' only with regard to its vertical placement and without regard to the precise rotational orientation of solenoid 270' with respect to valve cover 120'.

In various embodiments, the engagement of the valve cover mechanical stops 1300*a,b* and/or solenoid mechanical stops 1320*a,b* may be accompanied by a tactile and/or audible snap or click or other sound to confirm for someone who is building or servicing or otherwise handling the valve 170 that engagement has occurred. This engagement of the valve cover mechanical stops 1300*a,b* and/or solenoid mechanical stops 1320*a,b* may also be accompanied by a visual indication. This visual indication may come in the form of valve cover mechanical stops 1300*a,b* physically moving into the solenoid mechanical stops 1320*a,b*. In the current embodiment, there is one orientation of the solenoid 270' that will cause bend portions 1305*a,b* of valve cover mechanical stops 1300*a,b* to rest in an unbent, vertical position.

Figure 15:
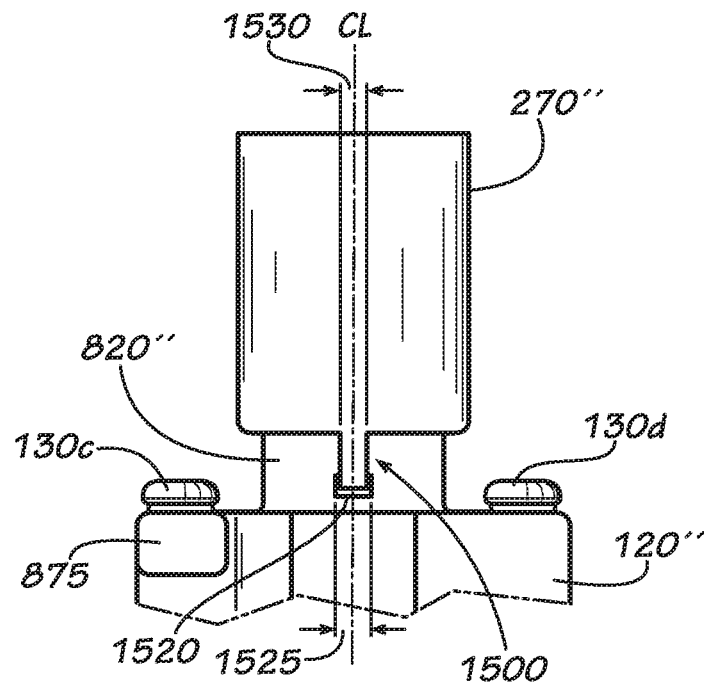
FIG. 15 is a side view of a solenoid attached to a valve cover of a third embodiment of a valve meter assembly taken from the same position as FIG. 9.
Figure 16:
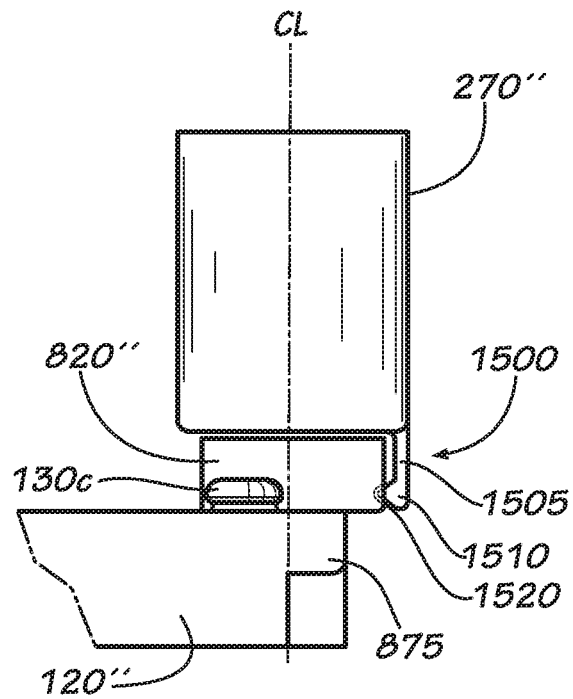
FIG. 16 is another side view of the solenoid and valve cover of the valve meter assembly of FIG. 15.

FIGS. 15 and 16 are side views of another embodiment of valve 170, wherein the threaded attachment portion 1120 and solenoid attachment sink 825 remain but the solenoid mechanical stop 1500 sets the rotational and therefore also the vertical position of solenoid 270'' with respect to valve cover 120''. Solenoid mechanical stop 1500 includes bend portion 1505 and engagement portion 1510. Valve cover mechanical stop 1520, defining width 1525 which is greater than width 1530 of solenoid mechanical stop 1500, prevents solenoid 270'' from being rotated too little or too much by providing a positive stop for solenoid mechanical stop 1500 to positively lock in valve cover mechanical stop 1520, thereby preventing over-tightening or under-tightening of solenoid 270'' in solenoid attachment sink 825 of solenoid attachment portion 820''. Valve cover mechanical stop 1520 may also be considered a detent in various embodiments because it holds solenoid mechanical stop 1500 in position. As a detent, valve cover mechanical stop 1520 precisely sets the position of solenoid 270'' to ensure its proper opening and closing function. In various embodiments including the current embodiment, solenoid mechanical stop 1500 may be considered a snap lever because it functions as a lever—with a lever arm represented by bend portion 1505 rotatable about a pivot—and snaps into position during engagement with valve cover mechanical stop 1520 although engagement may or may not be accompanied by an audible snap. Again, other embodiments are contemplated in which the solenoid mechanical stop 1500 is of a different size or shape or engagement method. For example, the valve cover mechanical stop and solenoid mechanical stop could be engageable via a fastener such as a round pin, screw, bolt, cotter pin, or canoe clip extending radially into a matching hole in the valve cover.

In various embodiments, the engagement of the solenoid mechanical stop 1500 and/or valve cover mechanical stop 1520 may be accompanied by a tactile and/or audible snap or click or other sound to confirm for someone who is building or servicing or otherwise handling the valve 170 that engagement has occurred. This engagement of the solenoid mechanical stop 1500 and/or valve cover mechanical stop 1520 may also be accompanied by a visual indication. This visual indication may come in the form of solenoid mechanical stop 1500 physically moving into the valve cover mechanical stop 1520. In the current embodiment, there is one orientation of the solenoid 270'' that will cause bend portion 1505 of solenoid mechanical stop 1500 to rest in an unbent, vertical position.

Figure 17:
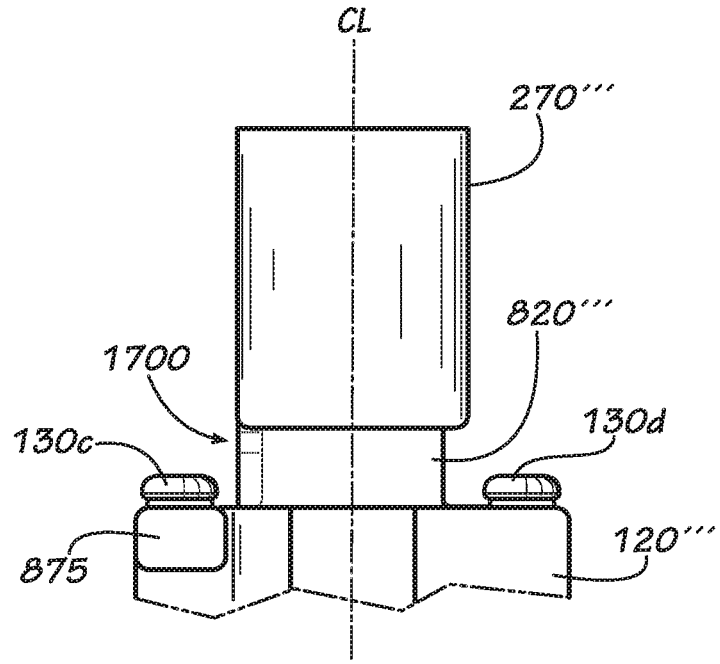
FIG. 17 is a side view of a solenoid attached to a valve cover of a fourth embodiment of a valve meter assembly taken from the same position as FIG. 9.
Figure 18:
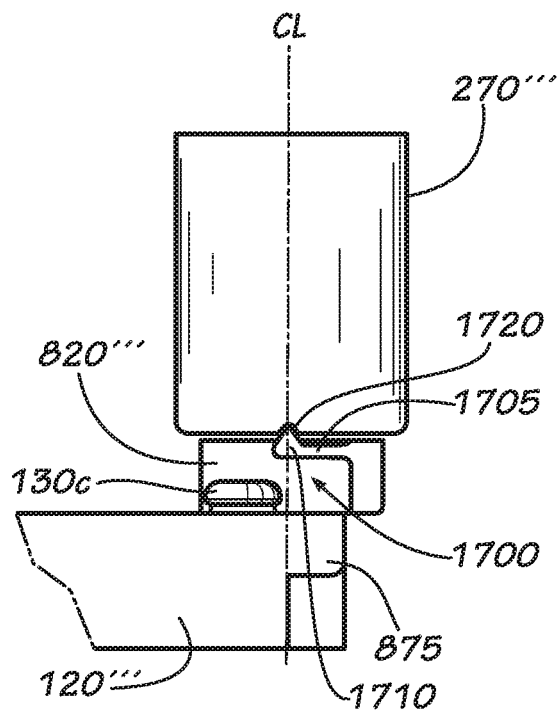
FIG. 18 is another side view of the solenoid and valve cover of the valve meter assembly of FIG. 17.

FIGS. 17 and 18 are side views of yet embodiment of valve 170, wherein the threaded attachment portion 1120 and solenoid attachment sink 825 of solenoid attachment portion 820''' remains but the valve cover mechanical stop 1700 of solenoid attachment portion 820''' sets the rotational position of solenoid 270''' with respect to valve cover 120'''. Valve cover mechanical stop 1700 includes bend portion 1705 and engagement portion 1710. Solenoid mechanical stop 1720 in solenoid 270''' engages engagement portion 1710 of valve cover mechanical stop 1700 and thereby prevents solenoid 270''' from being rotated too little or too much by providing a positive stop for solenoid 270''', thereby preventing over-tightening or under-tightening of solenoid 270'''. Solenoid mechanical stop 1720 may also be considered a detent in various embodiments because it holds valve cover mechanical stop 1700 in place. As a detent, solenoid mechanical stop 1720 precisely sets the position of valve cover mechanical stop 1700 and therefore also solenoid 270''' to ensure its proper opening and closing function. This helps precisely set the position of solenoid 270''' to ensure its proper opening and closing function. In various embodiments including the current embodiment, valve cover mechanical stop 1700 may be considered a snap lever because it functions as a lever—with a lever arm represented by bend portion 1705 rotatable about a pivot—and snaps into position during engagement with solenoid mechanical stop 1720 although engagement may or may not be accompanied by an audible snap.

In various embodiments, the engagement of the solenoid mechanical stop 1720 and/or valve cover mechanical stop 1700 may be accompanied by a tactile and/or audible snap or click or other sound to confirm for someone who is building or servicing or otherwise handling the valve 170 that engagement has occurred. This engagement of the solenoid mechanical stop 1720 and/or valve cover mechanical stop 1700 may also be accompanied by a visual indication. This visual indication may come in the form of valve cover mechanical stop 1700 physically moving into the solenoid mechanical stop 1720. In the current embodiment, there is one orientation of the solenoid 270''' that will cause bend portion 1705 of valve cover mechanical stop 1700 to rest in an unbent, horizontal position.

In an embodiment of the valve meter assembly 1000 (shown in FIG. 1), the wireless communication unit 2310 may receive signals from the remotely located communicator, or send signals to the remotely located communicator, or both. The signals may include valve control signals. The valve control signals may direct action of the solenoid 270 to open or to close and, thereby, to change the state of valve 170.

The valve orifice cylinder 280 provides the interface with the interface portion 1140 of the plunger 1130. The valve orifice cylinder 280 is chosen of an appropriate size to prevent excessive fluid flow, as excessive fluid flow will cause the diaphragm assembly 260 to lift away from the beveled edge 550 more quickly than may be desired.

In the current embodiment, the valve 170 is a pilot-operated valve. A pilot operated valve is a valve that experiences large-scale operation occurring naturally as a result of a small change in the pilot. As such, small amounts of energy can be used to control large-scale changes as the pilot changes. In the current embodiment, the pilot-operated valve is a diaphragm valve.

In use, the valve meter device 100 may assume one of two states: an "on" or "open" state and an "off" or "closed" state. A "trickle" or "reduced flow" state may be substituted for the "off" or "closed" state in various embodiments. The valve meter device 100 may be configured to assume either of the two possible states. The states correspond to the positioning of the valve 170.

The valve meter device 100 will typically be in the open state allowing a maximum, or near maximum, flow rate of water that is allowed to flow through the valve meter device 100. In one exemplary embodiment, maximum flow rate is about 25 gallons per minute, although other maximum flow rates are possible in accord with this disclosure. When the valve meter device 100 is in the open state, the valve 170 is open. When the valve 170 is open, which occurs when a flexible diaphragm of diaphragm assembly 260 is substantially lifted away from the beveled edge 550 (see FIG. 3 and also see disclosure of aforementioned U.S. Patent Publication No. 2012-0305084), the solenoid 270 is in the open position and the interface portion 1140 of the plunger 1130 is actuated away from the valve orifice cylinder 280.

During application of valve meter assembly 1000, water travels through the valve meter device 100 originating from a water source and entering in inlet 310. Water is permitted to travel through the inlet opening 612, and to the horizontal portion 610. When water reaches the intersection of the horizontal portion 610 and vertical portion 620, water is directed vertically into the vertical portion 620 by water pressure. Water exits the vertical portion 620 by flowing over the beveled edge 550. Water fills the valve transition portion 670 and—as will be described in more detail later—the valve cavity 905 and a media channel pathway 2610, which extends from the valve cavity 905 to the valve outlet portion 340. Water exits the valve portion 265 via the valve outlet portion 340 and enters the meter portion 264. Water then enters and fills the meter cavity 450. Pressure forces water into the metering inlet (not shown), through the meter 210, and out of the metering outlet 213 to the outlet 320. Once the water exits the outlet 320, the water flows through the downstream piping system and, ultimately, to the user terminal.

In the current embodiment wherein meter 210 is a nutating disc displacement flow meter, the water passing through the meter 210 moves a nutating disc (not shown) causing a meter magnet (not shown) to rotate. The rotation of the meter magnet causes a register to log the motion, leading to a measurement of water usage and a readout of water usage from the register.

A register circuit (not shown) configured to log the readout of water usage at preset timing intervals may be included with one embodiment of the valve meter device 100. In the current embodiment, the register circuit remains in a low power mode for the majority of its operating life. Low power, as used in this disclosure, means that the register circuit is using a very small amount of power when compared to the normal operating mode. This is commonly referred to as being in a "sleep mode." The register circuit "wakes up" at preset timing intervals to read the register and log the readout. In the current embodiment, a wireless communication unit circuit (not shown) is connected with the register circuit via wires 2360 (shown in FIG. 1). The wireless communication unit circuit (not shown) obtains the log of the register circuit and transmits the log to a remotely located communicator at preset timing intervals. The preset timing interval of the wireless communication unit 2310 may or may not be the same preset timing interval as that of the register circuit. In alternative embodiments, a separate register circuit may not be necessary if the wireless communication unit 2310 is capable of directly determining the measurement of water usage of the register.

The valve 170 is configured in the open state when the interface portion 1140 is lifted away from the valve orifice cylinder 280 because the solenoid 270 is in the open position. The valve cavity media channel 840 provides a water pressure link between the solenoid chamber 940 and the valve cavity 905 such that the water pressure in the valve cavity 905 will be the same as the water pressure in the solenoid chamber 940. When the solenoid 270 is in the open position, the plunger 1130 is lifted so that the valve orifice cylinder 280 is open to the valve cover media channel 830. When the valve orifice cylinder 280 is uncovered, water is allowed to flow from the solenoid chamber 940 through the valve cover media channel 830 into the media channel 520 and further into the valve outlet portion 340. Therefore, the water pressure in the valve cavity 905 is substantially the same as the water pressure in the media channel 520, the solenoid chamber 940, the media channel 520, and the valve outlet portion 340. Thus, the diaphragm has no pressure behind it to close the valve 170. The valve 170 remains open. Although the current embodiment has the valve orifice cylinder 280 located on the valve cover media channel 830 such that there is a pressure link between the valve cavity 905 and the solenoid chamber 940, the valve orifice cylinder 280 may be located within the valve cavity media channel 840 in various embodiments. Other locations for the valve orifice cylinder 280 and orifice bore 285 are also contemplated by the current disclosure.

Changing the valve meter device 100 to a closed state requires the valve 170 to be changed to closed. Where a trickle state is included, the water supply valve must be changed to a trickle state, which may be the same as the closed state in various embodiments. This is accomplished by operation of the plunger 1130 moving into a closed position having the interface portion 1140 contacting the valve orifice cylinder 280, which provides a water-tight seal over the valve cover media channel 830. In the closed state, the valve meter device 100 allows no water flow through. In the trickle state, the valve meter device 100 allows minimal water flow through. In the current embodiment, the valve 170 is a diaphragm valve with a pressure-controlled pilot operation. To move the valve meter device 100 into the closed state, the solenoid 270 is engaged, or "thrown," and closed onto the valve orifice cylinder 280. This closes or "severs" the media channel pathway 2610. Water flow is blocked from the solenoid chamber 940 to the valve cover media channel 830 as well as to the media channel 520 and media channel relief 530 thereby isolating the solenoid chamber 940, the valve cavity media channel 840, and the valve cavity 905 as one water pressure pool. Thus, the closing of the solenoid 270 is the pilot operation that triggers the dynamic state of the valve 170. The valve 170 is in the closed state when the interface portion 1140 of the plunger 1130 is in contact with the valve orifice cylinder 280 and the diaphragm assembly 260 has traveled and contacted the beveled edge 550, sealing the valve 170.

After the solenoid 270 is closed or thrown, water may no longer exit the valve cavity 905, so the valve cavity 905 no longer has media pressure behind it. Spring force provided from the diaphragm or from the optional spring 250 forces the diaphragm assembly 260 down toward the valve inlet portion 330 of the device housing 110. The spring 250 is optional because, depending on the configuration of the diaphragm, the diaphragm may already be biased toward closing the valve 170 without the spring 250. As the diaphragm assembly 260 moves toward the valve inlet portion 330, some of the water flowing through the valve portion 265 will leak through the diaphragm assembly 260 and into the valve cavity 905. The increased volume of water in the valve cavity 905 creates increased pressure in the valve cavity 905. The increased pressure in the valve cavity 905 is applied to the entire surface of the diaphragm because the valve cavity 905 extends across the entire diaphragm. This increased pressure applied over the entire diaphragm further biases the diaphragm assembly 260 in the direction of the valve inlet portion 330.

The increased bias causes the diaphragm assembly 260 to travel toward the valve inlet portion 330, eventually seating the bottom of an inner flat portion (not shown) of the diaphragm onto the beveled edge 550 of the top edge portion 640 of the valve inlet portion 330. When the diaphragm seats onto the beveled edge 550, the valve 170 is in the closed state.

Once the diaphragm has seated, water pressure from the valve inlet portion 330 equalizes with water pressure in the valve cavity 905 because water can pass into the valve cavity 905 through the valve cone 1210 of the diaphragm assembly 260 but cannot exit the valve cavity 905 down the media channel pathway 2610. With equalized pressure, the valve 170 remains in the closed state because the cross-section of the valve inlet portion 330 provides a smaller surface area over which to apply pressure to the diaphragm than the surface area of the diaphragm 1230 that interfaces with the valve cavity 905. With the same pressure, a smaller surface area over which the pressure is applied produces a smaller force than the same pressure applied to a larger surface area. The result is a net downward force on the diaphragm, maintaining the valve 170 in the closed state. The trickle state is accomplished by placing the diaphragm in the same position as the diaphragm 1230 is placed in the closed state. However, in the trickle state, a small amount of water is allowed to bypass the valve 170 via a leak passageway (not shown) defined in the diaphragm or a bypass channel (not shown) from the valve inlet portion 330 to the valve outlet portion 340. The bypass channel or leak passageway may be a small bore leading from the valve inlet portion 330 to the valve outlet portion 340 and may be placed in the vertical portion 620, for example. The bore would be small enough that a significant amount of water would not flow through the bore. A sealing valve may allow selective flow through the bore.

To reopen the valve 170, the solenoid 270 is actuated so that the interface portion 1140 lifts away from the valve orifice cylinder 280, opening the media channel pathway 2610. Opening the media channel pathway 2610 establishes a pressure link between all of the components of the media channel pathway 2610, including the valve cavity 905, the valve cavity media channel 840, the solenoid chamber 940, the valve cover media channel 830, the media channel relief 530, and the media channel 520. When the pressure in the valve cavity 905 is reduced, the downward force on the diaphragm and the diaphragm assembly 260 is also reduced. The pressure in the valve inlet portion 330 provides greater upward force on the bottom of the diaphragm than the downward force on the top of the diaphragm. This downward force may be provided by the spring 250 or by the inherent bias of the diaphragm. The result is a lifting of the diaphragm assembly 260, thereby opening the valve 170.

The solenoid 270 may be engaged or lifted by manual operation, by electronic actuation, or by remote control. In one embodiment, the wireless communication unit 2310 is capable of receiving electrical signals for the solenoid 270 to control its operation. Actuation of the plunger 1130 in the current embodiment is performed by a solenoid 270, which is a latching solenoid in the current embodiment. A latching solenoid is a solenoid 270 that latches in place. A latching solenoid does not utilize energy once it has achieved its desired position but does use energy to change positions. However, this actuation can be performed via a number of mechanical or electromechanical interfaces, including stepper motors, DC motors, non-latching solenoids, electromagnets and other electromagnetic devices, and spring assemblies, among others. This embodiment would allow a remotely located communicator to control operation of the valve 170, allowing the valve 170 to be changed to an open or closed state from a remote location.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
a valve cover, the valve cover comprising a solenoid attachment portion defining a threaded solenoid attachment sink and a valve cover mechanical stop; and
a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop engageable with the valve cover mechanical stop;
wherein the valve cover mechanical stop and the solenoid mechanical stop are configured to create a sound upon engagement with each other, the sound being one of a snap and a click, a one of the valve cover mechanical stop and the solenoid mechanical stop defining a snap lever.

2. The valve of claim 1, wherein the solenoid mechanical stop is integrally formed with the solenoid body.

3. The valve of claim 1, wherein the solenoid mechanical stop protrudes from an outer surface of the solenoid body.

4. The valve of claim 3, wherein the valve cover mechanical stop protrudes from an outer surface of the solenoid attachment portion.

5. The valve of claim 1, wherein the snap lever comprises an engagement portion and a bend portion, the engagement portion configured to engage the valve cover mechanical stop and the bend portion configured to bend during engagement of the engagement portion with the valve cover mechanical stop.

6. The valve of claim 1, wherein the snap lever comprises an engagement portion and a bend portion, the engagement portion configured to engage the solenoid mechanical stop and the bend portion configured to bend during engagement of the engagement portion with the solenoid mechanical stop.

7. An assembly comprising:
a housing, the housing defining at least one inlet opening, at least one outlet opening, and a channel connecting the at least one inlet opening and the at least one outlet opening; and
a valve in communication with the channel and configured to control the flow of water through the assembly, the valve comprising:
a valve cover, the valve cover comprising a solenoid attachment portion defining a threaded solenoid attachment sink and a valve cover mechanical stop; and
a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop engageable with the valve cover mechanical stop;
wherein a one of the valve cover mechanical stop and the solenoid mechanical stop is configured to snap into engagement with another of the valve cover mechanical stop and the solenoid mechanical stop.

8. The assembly of claim 7, wherein the one of the solenoid mechanical stop and the valve cover mechanical stop defines a snap lever.

9. The assembly of claim 7, wherein another of the valve cover mechanical stop and the solenoid mechanical stop defines a detent to further fix the position of the solenoid.

10. A method of installing an actuator, the method comprising:
preparing a valve assembly containing a valve and device housing, the valve comprising a valve cover and an actuator, the valve cover comprising an attachment portion and a valve cover mechanical stop, the actuator comprising a body and a mechanical stop;
installing the actuator in the valve cover until the mechanical stop of the actuator engages with the valve cover mechanical stop;
confirming engagement of the mechanical stop of the actuator with the valve cover mechanical stop via a sound created by contacting the mechanical stop of the actuator with the valve cover mechanical stop.

11. The method of claim 10, wherein the actuator is a solenoid.

12. The method of claim 10, wherein the sound is a one of a snap and a click.

13. The method of claim 10, wherein a one of the valve cover mechanical stop and the solenoid mechanical stop comprises a snap lever and another of the valve cover mechanical stop and the solenoid mechanical stop defines a detent sized to receive the snap lever.

14. The method of claim 10, wherein installing the actuator in the valve cover comprises snapping a one of the valve cover mechanical stop and the solenoid mechanical stop into engagement with another of the valve cover mechanical stop and the solenoid mechanical stop.

15. The method of claim 10, wherein the valve cover mechanical stop protrudes from an outer surface of the attachment portion of the actuator and the mechanical stop of the actuator protrudes from an outer surface of the actuator body.

16. A valve comprising:
a valve cover, the valve cover comprising a solenoid attachment portion defining a threaded solenoid attachment sink and a valve cover mechanical stop; and
a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop engageable with the valve cover mechanical stop;

wherein the valve cover mechanical stop and the solenoid mechanical stop are configured to create a sound upon engagement with each other, a one of the valve cover mechanical stop and the solenoid mechanical stop defining a snap lever.

17. The valve of claim 16, wherein a one of the valve cover mechanical stop and the solenoid mechanical stop defines a detent to further fix the position of the solenoid.

18. The valve of claim 16, wherein the solenoid mechanical stop extends axially past a bottom end of the solenoid body.

19. The valve of claim 16, wherein the solenoid mechanical stop defines a snap lever, the snap lever comprising an engagement portion and a bend portion, the engagement portion configured to engage the valve cover mechanical stop and the bend portion configured to bend during engagement of the engagement portion with the valve cover mechanical stop.

20. The valve of claim 16, wherein the valve cover mechanical stop defines a snap lever, the snap lever comprising an engagement portion and a bend portion, the engagement portion configured to engage the solenoid mechanical stop and the bend portion configured to bend during engagement of the engagement portion with the solenoid mechanical stop.

21. A valve comprising:
a valve cover, the valve cover comprising a solenoid attachment portion defining a threaded solenoid attachment sink and a valve cover mechanical stop; and
a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop engageable with the valve cover mechanical stop;
wherein the valve cover mechanical stop and the solenoid mechanical stop are configured to create a sound upon engagement with each other, a one of the valve cover mechanical stop and the solenoid mechanical stop defining a detent to further fix the position of the solenoid.

22. A valve comprising:
a valve cover, the valve cover comprising a solenoid attachment portion defining a threaded solenoid attachment sink and a valve cover mechanical stop; and
a solenoid, the solenoid comprising a solenoid body, a valve cover attachment portion defining a threaded attachment portion engageable with the threaded solenoid attachment sink, the solenoid body comprising a solenoid mechanical stop, the solenoid mechanical stop engageable with the valve cover mechanical stop and extending axially past a bottom end of the solenoid body;
wherein the valve cover mechanical stop and the solenoid mechanical stop are configured to create a sound upon engagement with each other.

\* \* \* \* \*